(12) United States Patent
Yang et al.

(10) Patent No.: US 11,979,595 B2
(45) Date of Patent: May 7, 2024

(54) SYMMETRIC MERGE MODE MOTION VECTOR CODING

(71) Applicant: VID SCALE, INC., Wilmington, DE (US)

(72) Inventors: Hua Yang, Plainsboro, NJ (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 147 days.

(21) Appl. No.: 17/438,119

(22) PCT Filed: Mar. 11, 2020

(86) PCT No.: PCT/US2020/022139
§ 371 (c)(1),
(2) Date: Sep. 10, 2021

(87) PCT Pub. No.: WO2020/185925
PCT Pub. Date: Sep. 17, 2020

(65) Prior Publication Data
US 2022/0182657 A1    Jun. 9, 2022

Related U.S. Application Data

(60) Provisional application No. 62/816,586, filed on Mar. 11, 2019.

(51) Int. Cl.
*H04N 19/52*     (2014.01)
*H04N 19/105*    (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
CPC .... H04N 19/52; H04N 19/105; H04N 19/139; H04N 19/159; H04N 19/172; H04N 19/30; H04N 19/577
(Continued)

(56) References Cited

U.S. PATENT DOCUMENTS

2015/0312588 A1* 10/2015 Yamamoto ........... H04N 19/463
375/240.15
2016/0050430 A1    2/2016 Xiu et al.
(Continued)

FOREIGN PATENT DOCUMENTS

CN          105122803 A      12/2015
CN          108605137 A      9/2018
(Continued)

OTHER PUBLICATIONS

Bossen et al., "JVET Common Test Conditions and Software Reference Configurations for SDR Video", JVET-M1010-v1, Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
(Continued)

*Primary Examiner* — Matthew David Kim
(74) *Attorney, Agent, or Firm* — Condo Roccia Koptiw LLP

(57) ABSTRACT

Systems, devices, and methods are described herein for symmetric merge mode motion vector coding. Symmetric bi-prediction (bi-pred) motion vectors (MVs) may be constructed from available candidates in a merge candidate list for regular inter prediction merge mode and/or affine prediction merge mode. Available MV merge candidates may be symmetrically extended or mapped in either direction (e.g., between reference pictures before and after a current picture), for example, when coding a picture that allows
(Continued)

bi-directional motion compensation prediction (MCP). A symmetric bi-pred merge candidate may be selected among merge candidates for predicting the motion information of a current prediction unit (PU). The symmetric mapping construction may be repeated by a decoder (e.g., based on a coded index of the MV merge candidate list), for example, to obtain the same merge candidates and coded MV at an encoder.

21 Claims, 14 Drawing Sheets

(51) Int. Cl.
  *H04N 19/139* (2014.01)
  *H04N 19/159* (2014.01)
  *H04N 19/172* (2014.01)
  *H04N 19/30* (2014.01)
  *H04N 19/577* (2014.01)

(52) U.S. Cl.
  CPC ......... *H04N 19/159* (2014.11); *H04N 19/172* (2014.11); *H04N 19/30* (2014.11); *H04N 19/577* (2014.11)

(58) Field of Classification Search
  USPC .................................................. 375/240.16
  See application file for complete search history.

(56) References Cited

U.S. PATENT DOCUMENTS

| | | | | |
|---|---|---|---|---|
| 2018/0249154 | A1* | 8/2018 | Chuang | H04N 19/567 |
| 2018/0270500 | A1* | 9/2018 | Li | H04N 19/52 |
| 2018/0359483 | A1* | 12/2018 | Chen | H04N 19/54 |
| 2019/0058896 | A1 | 2/2019 | Huang et al. | |
| 2020/0267408 | A1* | 8/2020 | Lee | H04N 19/139 |
| 2020/0366928 | A1* | 11/2020 | Liu | H04N 19/52 |
| 2020/0404253 | A1* | 12/2020 | Chen | B23P 15/00 |
| 2021/0266588 | A1* | 8/2021 | Liu | H04N 19/70 |
| 2021/0377520 | A1* | 12/2021 | Chen | H04N 19/513 |
| 2022/0191477 | A1* | 6/2022 | Zhang | H04N 19/109 |
| 2023/0156181 | A1* | 5/2023 | Chen | H04N 19/436 375/240.02 |

FOREIGN PATENT DOCUMENTS

| | | |
|---|---|---|
| EP | 3547687 A2 | 10/2019 |
| WO | 2012/121808 A1 | 9/2012 |
| WO | 2017/036414 A1 | 3/2017 |
| WO | 2018/097693 A2 | 5/2018 |

OTHER PUBLICATIONS

Bossen, Frank, "VTM-4.0 Reference Software", Available at <https://vcgit.hhi.fraunhofer.de/jvet/VVCSoftware_VTM/tags/VTM-4.0>, pp. 1-2.

Bross et al., "High Efficiency Video Coding (HEVC) Text Specification Draft 10", JCTVC-L1003_34, Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, 310 pages.

Bross et al., "Versatile Video Coding (Draft 4)", JVET-M1001-v7, Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.

Chen et al., "Algorithm Description for Versatile Video Coding and Test Model 4 (VTM 4)", JVET-M1002-V2, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-62.

Chen et al., "CE4: Symmetrical MVD Mode (Test 4.5.1)", JVET-L0370-V1, Huawei Technologies. Co., Ltd., Joint Video Experts Team (JVET) of ITU-T SG 16 WP 3 and ISO/IEC JTC 1/SC 29/WG 11, 12th Meeting: Macau, China, Oct. 3-12, 2018, pp. 1-4.

Chen et al., "Description of SDR, HDR and 360° Video Coding Technology Proposal by Qualcomm and Technicolor—Low and High Complexity Versions", JVET-J0021, Qualcomm, Technicolor, Joint Video Exploration Team (JVET) of ITU-T SG 16 WP 3 and ISO/IEC JTC 1/SC 29/WG 11, 10th Meeting: San Diego, US, Apr. 10-20, 2018, 43 pages.

Fuh et al., "Motion Displacement Estimation Using an Affine Model for Image Matching", Optical Engineering, vol. 30, No. 7, Jul. 1991, pp. 881-887.

ITU-T, "Advanced Video Coding for Generic Audiovisual Services", ITU-T Recommendation H.264, Series H: Audiovisual and Multimedia Systems, Infrastructure of Audiovisual Services—Coding of Moving Video, Nov. 2007, 563 pages.

Li et al., "An Efficient Four-Parameter Affine Motion Model for Video Coding", IEEE Transactions on Circuits and Systems for Video Technology, vol. 28, No. 8, Aug. 2018, pp. 1934-1948.

Luo et al., "CE4-Related: Simplified Symmetric MVD Based on CE4.4.3", JVET-M0444-v2, Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.

Segall et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.

SMPTE, "VC-1 Compressed Video Bitstream Format and Decoding Process", SMPTE 421M, Apr. 2006, 493 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

* cited by examiner

Affine MVF per sub-block 6 parameter affine model 4 parameter affine model

# SYMMETRIC MERGE MODE MOTION VECTOR CODING

CROSS REFERENCE TO RELATED APPLICATIONS

This application is the National Stage Entry under 35 U.S.C. § 371 of Patent Cooperation Treaty Application No. PCT/US2020/022139, filed Mar. 11, 2020, which claims priority to U.S. Provisional Patent Application No. 62/816,586, filed on Mar. 11, 2019, and entitled "Symmetric Motion Vector Difference Coding," the entirety of which is incorporated by reference as if fully set forth herein.

BACKGROUND

Video coding systems may be used to compress digital video signals, e.g., to reduce the storage and/or transmission bandwidth needed for such signals. Video coding systems may include block-based, wavelet-based, and/or object-based systems.

SUMMARY

Systems, devices, and methods are described herein for symmetric merge mode motion vector coding. Symmetric bi-prediction (bi-pred) motion vectors (MVs) may be constructed from available candidates in a merge candidate list for regular inter prediction merge mode and/or affine prediction merge mode. Available MV merge candidates may be symmetrically extended or mapped in either direction (e.g., between reference pictures before and after a current picture), for example, when coding a picture that allows bi-directional motion compensation prediction (MCP). A symmetric bi-pred MV may be selected among merge candidates as an MV for a current prediction unit (PU). The symmetric mapping construction may be repeated (e.g., based on a coded index of the MV merge candidate list), for example, at a decoding device to obtain the same merge candidates and coded MV at an encoding device.

In an example, a method may be implemented to determine the motion information, including a motion vector (MV) for a prediction unit (PU) in a current picture. The method may be implemented, for example, by a device, which may comprise a computer readable storage medium storing, and/or a processor configured to execute, computer executable instructions that, when executed, perform the method to determine a motion vector (MV) for a prediction unit (PU) in a current picture. A method may include obtaining (e.g., retrieving, generating or constructing) a merge candidate list for a PU in a current picture. The merge candidate list may include a first merge candidate comprising a first MV associated with a first reference picture in a first reference picture list. A symmetric merge candidate may be obtained (e.g., constructed), for example, via symmetric mapping of the first merge candidate. The symmetric merge candidate may comprise a second MV symmetric to the first MV. The symmetric merge candidate may be associated with a second reference picture in a second reference picture list. The symmetric merge candidate may be a bi-prediction merge candidate and may include the first MV associated with a first reference picture in the first reference picture list, and the second MV symmetric to the first MV associated with the second reference picture in the second reference picture list. The symmetric merge candidate may be merged (e.g., added) to the merge candidate list. A merge candidate (e.g., the symmetric merge candidate) may be selected from the merge candidate list for predicting an MV the PU.

The first and second reference pictures may be symmetric relative to the current picture. For example, the first and second reference pictures may have a same picture order count (POC) distance, e.g. in opposite directions, to the current picture.

Construction of a symmetric merge candidate may be based on whether the second reference picture list contains a symmetric reference picture of the first reference picture, e.g., with a picture order count (POC) distance to the current picture equal to a POC distance between the first reference picture to the current picture. In an example, on a condition that a symmetric reference picture exists in the second reference picture list, the first merge candidate may be selected to derive the symmetric merge candidate. The symmetric reference picture is the second reference picture of the symmetric merge candidate.

The other reference picture list may not include a symmetric reference picture. A reference picture with a closest POC distance may be selected as the second reference picture of the symmetric merge candidate. For example, a reference picture in the second reference picture list with a POC distance to the current picture closest to the POC distance between the first reference picture and the current picture may be selected.

Motion vector scaling may be applied, for example, to construct the second MV for the symmetric merge candidate. Scaling may be based on the POC distance between the second reference picture and the current picture, and the PO distance between the first reference picture and the current picture.

In an example, a symmetric merge candidate may be constructed and added to the merge candidate list, for example, only if the first merge candidate is a uni-directional prediction merge candidate. In various implementations, the symmetric merge candidate may be constructed and added to the merge candidate list, for example, regardless of whether the first merge candidate is a bi-directional prediction (bi-pred) merge candidate or a uni-prediction merge candidate.

For example, a determination may be made that the first merge candidate is a bi-directional prediction candidate with the first MV based on the first reference picture in the first reference picture list and a third MV based on a third reference picture in the second reference picture list. A second symmetric merge candidate may be constructed via symmetric mapping of the first merge candidate, the second symmetric merge candidate may comprise a fourth MV symmetric to the third MV and associated with a fourth reference picture in the first reference picture list. A POC distance between the fourth reference picture and the current picture may be equal or similar to a POC distance between the third reference picture and the current picture.

Addition of a symmetric merge candidate to a merge candidate list may be based on a determination, e.g., before adding the symmetric merge candidate to the merge candidate list, that the symmetric merge candidate is not redundant with any other merge candidate in the merge candidate list.

Addition of a symmetric merge candidate to a merge candidate list may be based on a determination, e.g., before adding the symmetric merge candidate to the merge candidate list, that adding the merge candidate to the merge candidate list will not exceed at least one of a maximum number of allowed merge candidates and a maximum number of allowed symmetric merge candidates.

A symmetric merge candidate may be added to a merge candidate list in a specific order, e.g., after non-zero MV merge candidates and before any zero MV merge candidates in the merge candidate list.

The merge candidates may be regular or affine merge candidates. For example, the first merge candidate may include at least two candidate control point MVs (CPMVs), and the symmetric merge candidate may comprise at least two symmetric-mapped CPMVs, respectively symmetric to the at least two CPMVs of the first merge candidate. The at least two symmetric-mapped CPMVs may be derived by a symmetric mapping of the at least two CPMVs.

In an example of a four-parameter affine model, there may be a symmetric mapping of first and second candidate CPMVs of the first merge candidate to first and second symmetric CPMVs of the symmetric merge candidate. For example, four affine candidate CPMV parameters comprising x and y spatial translations, a zooming factor and a rotation angle may be symmetrically mapped to four affine symmetric CPMV parameters comprising negative x and y spatial translations, an inverse zooming factor and a negative rotation angle. The first and second symmetric CPMVs may be derived based on the four affine symmetric CPMV parameters.

In an example of a six-parameter affine model, there may be a symmetric mapping of first, second, and third candidate CPMVs of the first merge candidate to first, second, and third symmetric CPMVs of the symmetric merge candidate. For example, six affine candidate CPMV parameters comprising x and y spatial translations, x and y zooming factors and x and y rotation angles may be symmetrically mapped to six affine symmetric CPMV parameters comprising negative x and y spatial translations, inverse x and y zooming factors and negative x and y rotation angles. The first, second, and third symmetric CPMVs may be derived based on the six affine symmetric CPMV parameters.

The method(s) described herein may be performed by a decoder. In some examples, the method(s) herein or a corresponding method(s) may be performed by an encoder. A computer-readable medium may include instructions for causing one or more processors to perform the method(s) described herein. A computer program product including instructions which, when the program is executed by one or more processors, may cause the one or more processors to carry out the method(s) described herein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
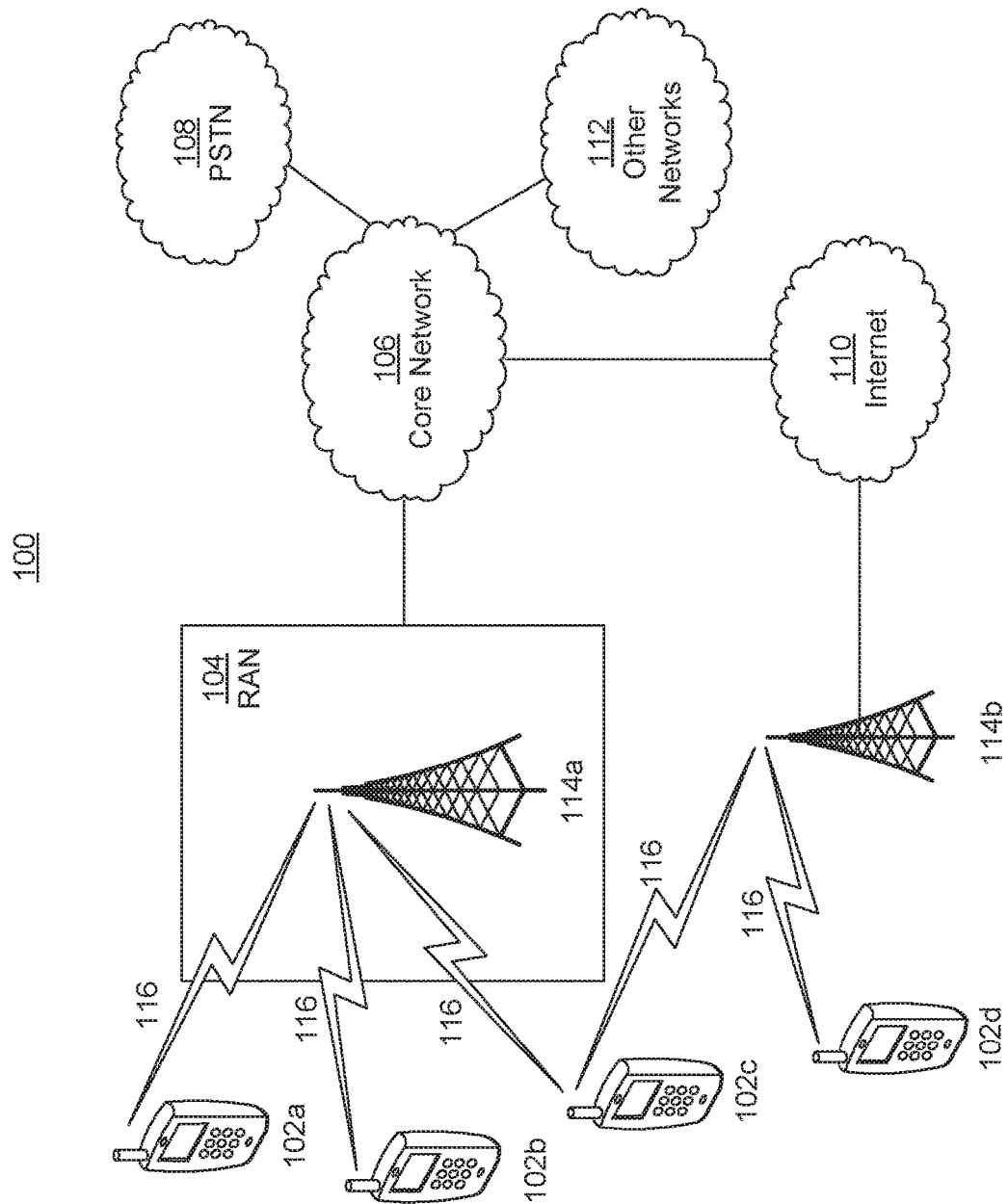
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WVTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WVTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), interim Standard 95 (IS-95), interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the ON 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
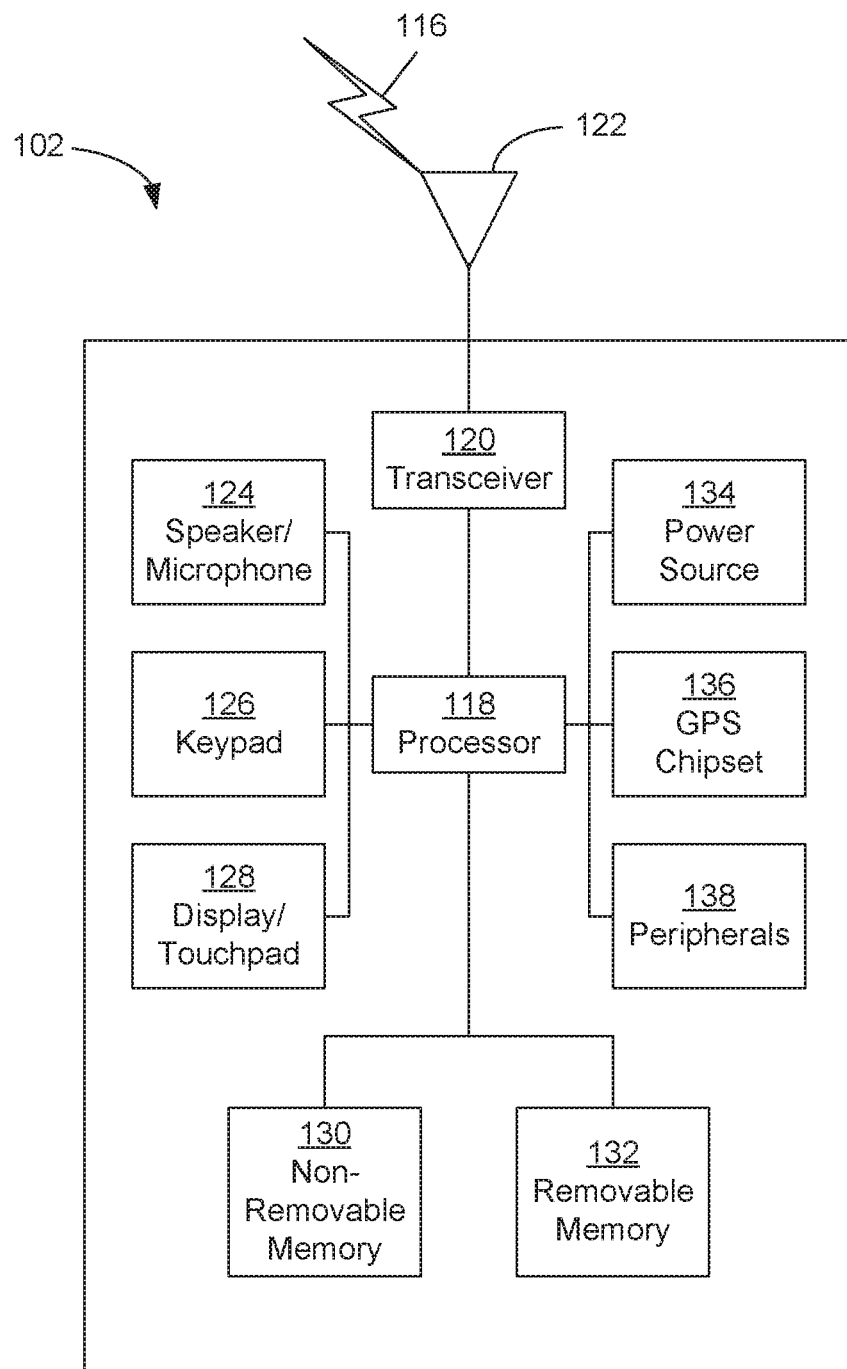
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
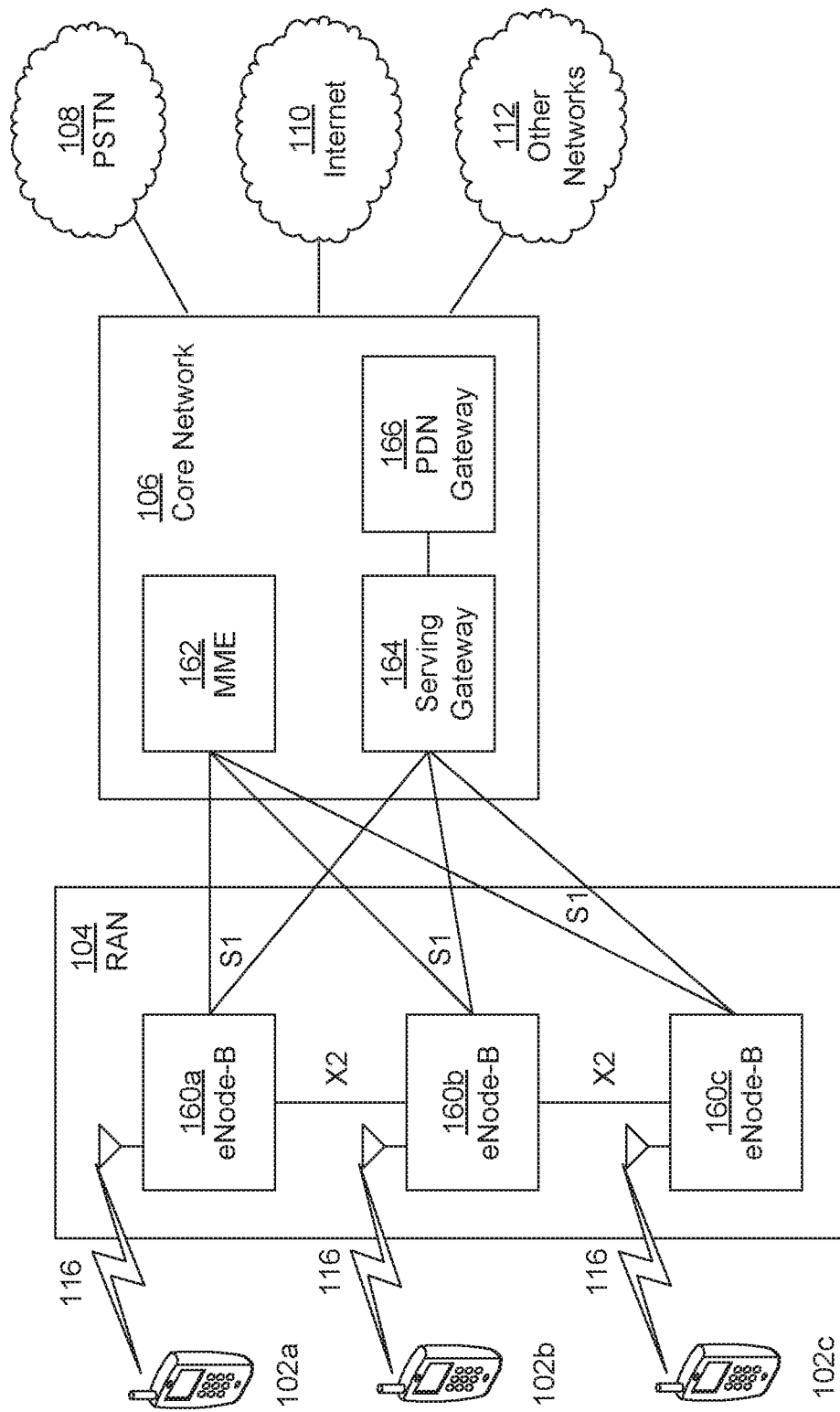
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the ON 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the ON 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g. only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
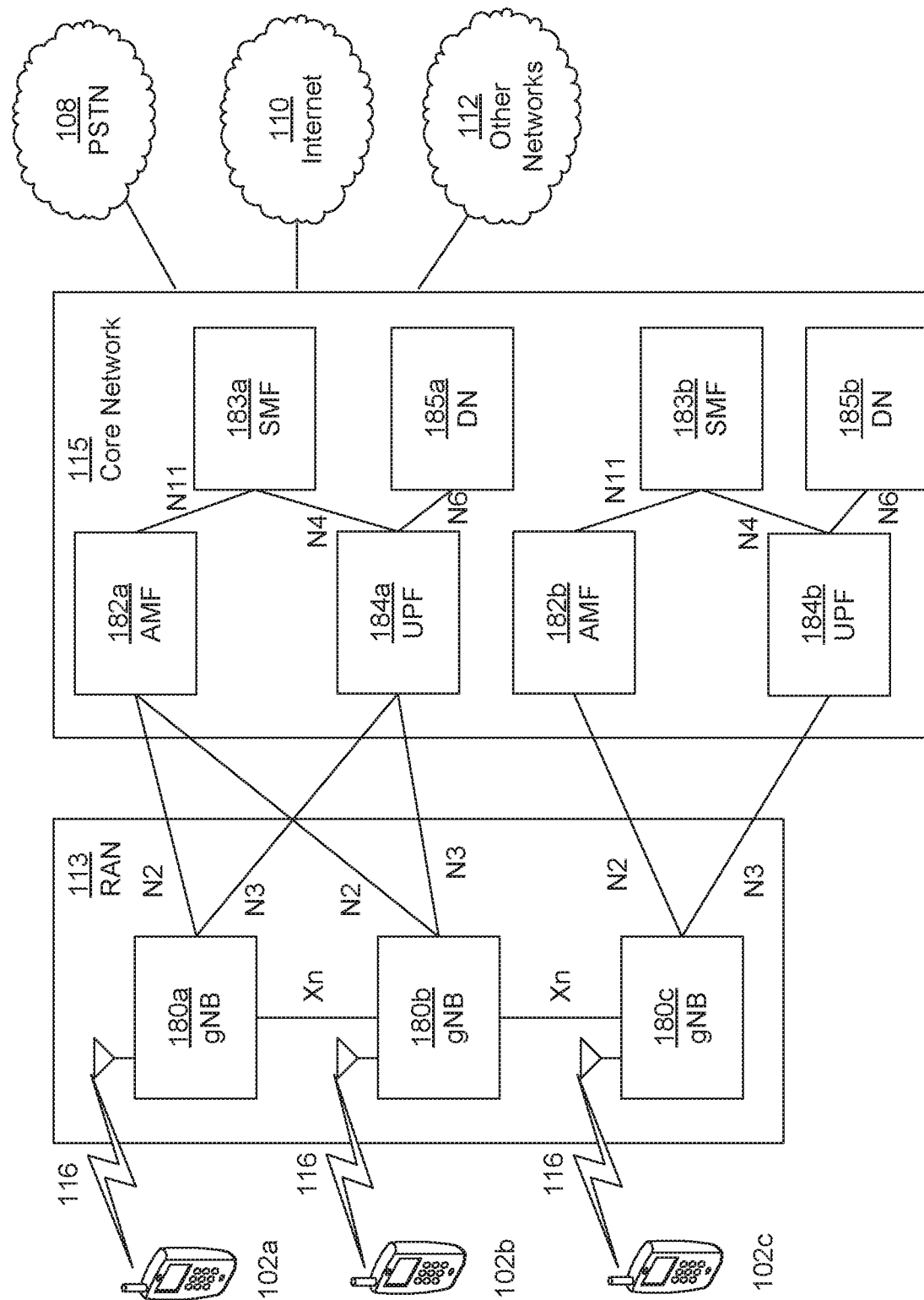
FIG. 1D is a system diagram illustrating a further example RAN and a further example ON that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-11 described herein may provide some examples, but other examples are contemplated. The discussion of FIGS. 5-11 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
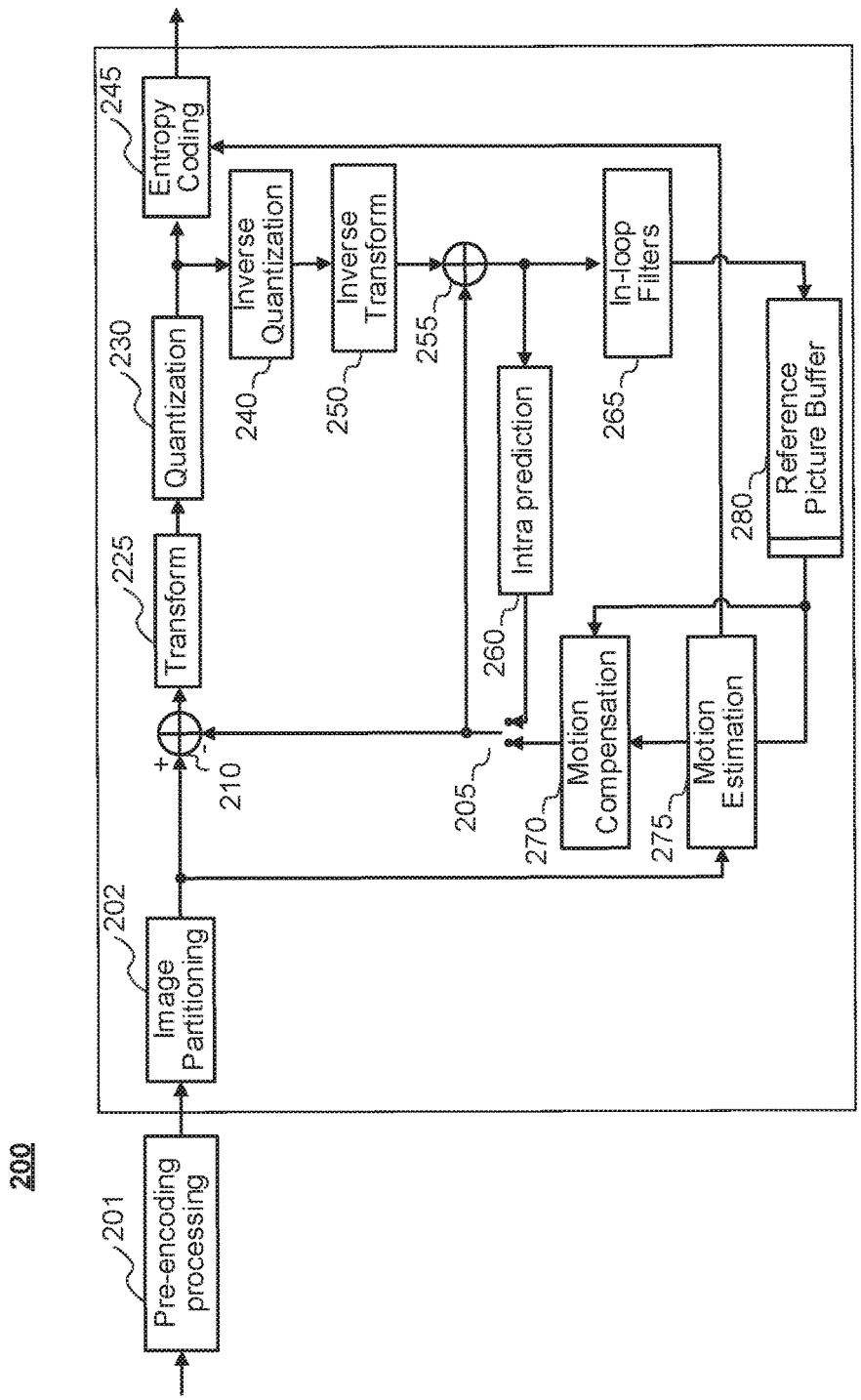
FIG. 2 is a diagram showing an example block-based video encoder.
Figure 3:
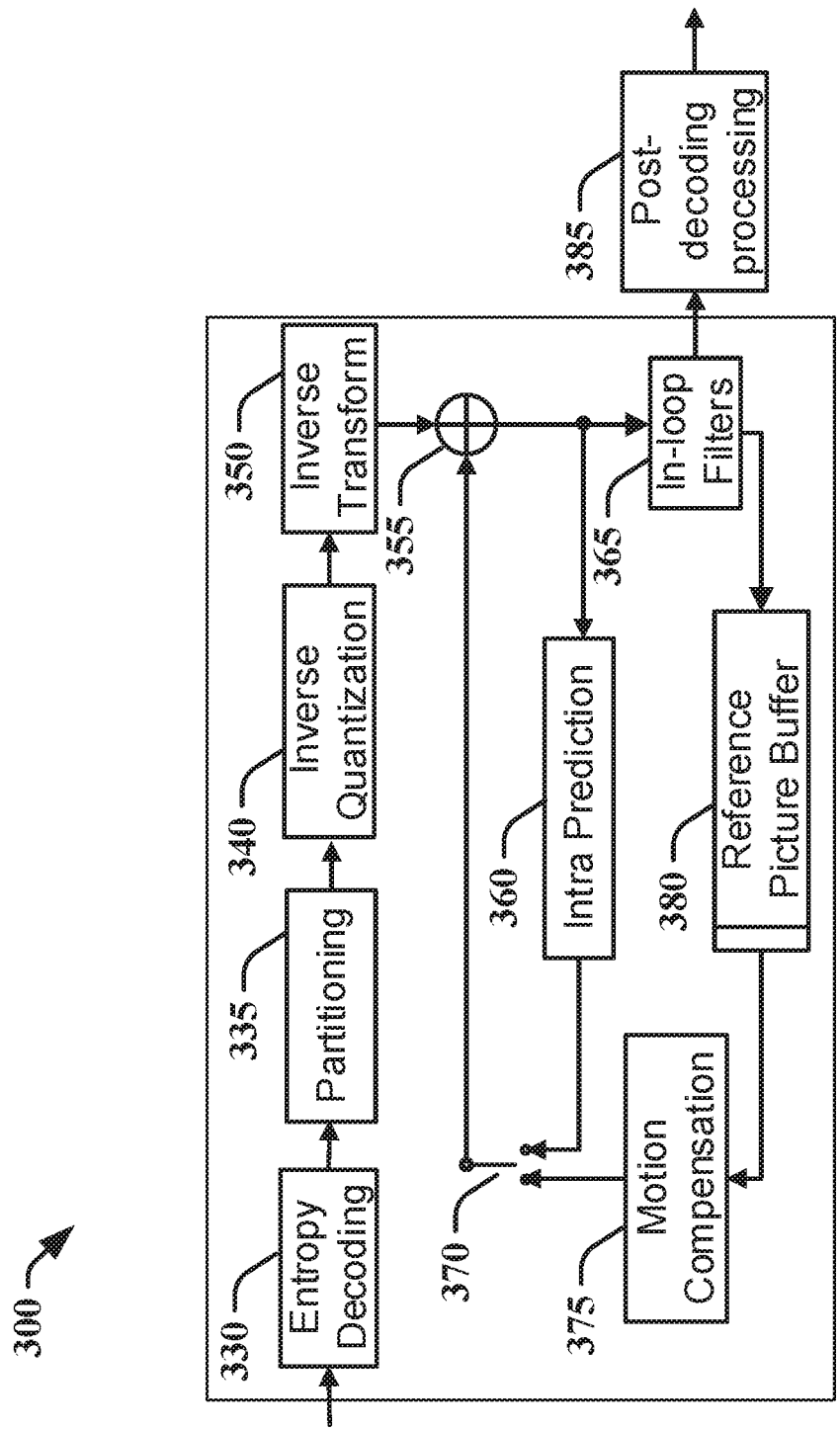
FIG. 3 is a diagram showing an example video decoder.

Various methods and other aspects described in this application may be used to modify modules, for example, decoding modules, of a video encoder 100 and decoder 200 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as a maximum allowed size of a merge list as 6, a 4×4 luma sub-block, a 4×4 chroma sub-block, a 1/16 fraction accuracy, a 4-parameter affine model, a 6-parameter affine model, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280), FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
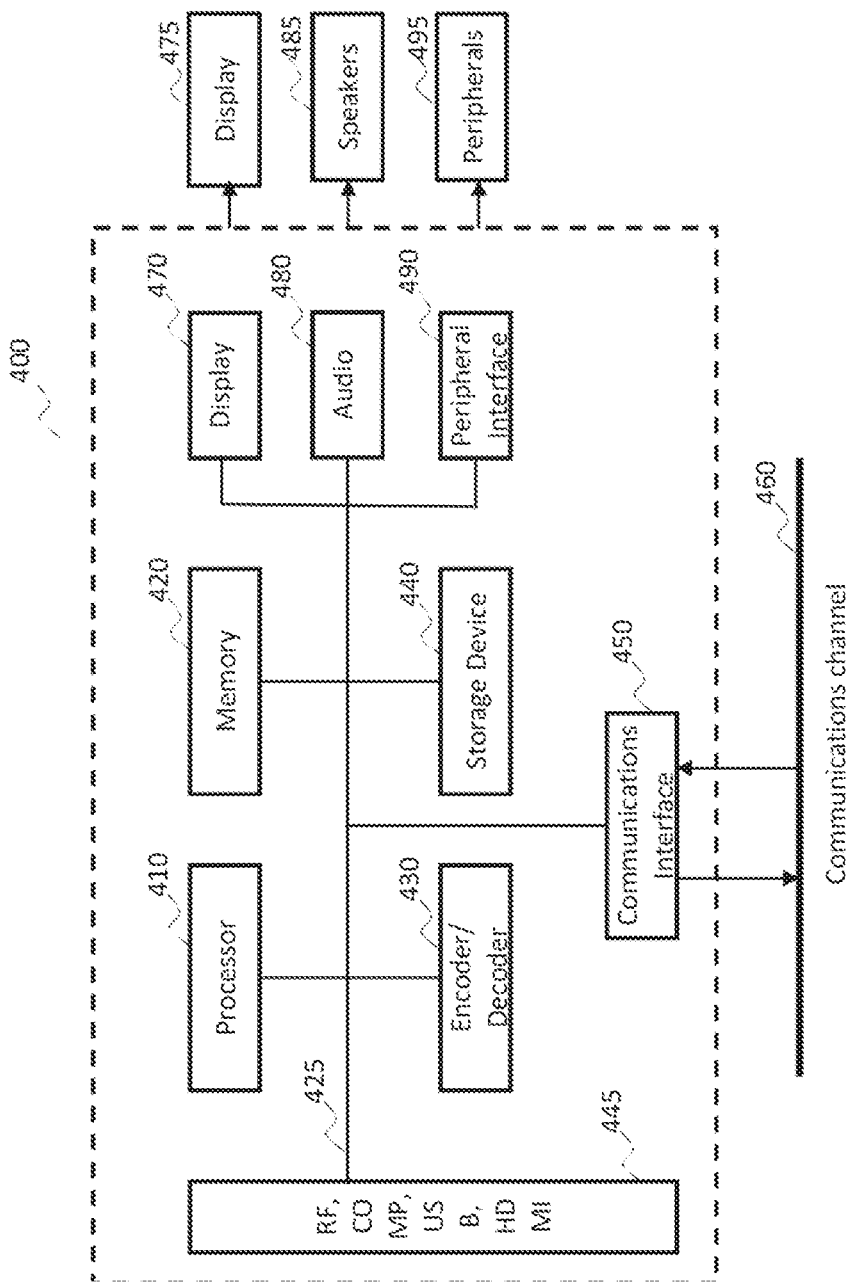
FIG. 4 is a diagram showing an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video coding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples of examples, one or more of a stand-alone digital video disc (or digital versatile disc) (DVR, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, performing symmetric merge mode MV decoding, generating merge candidate lists, decoding motion vectors (MVs) for motion compensated prediction (MCP), generating symmetric merge candidates for regular and affine inter prediction, generating history-based MVP (HMVP) merge candidates, performing an MV refinement search of bi-prediction MVs (e.g., performing decoder side motion vector refinement (DMVR)), utilizing look-up-tables (LUTs) to solve for affine model parameter values, and/or decoding an index of an MVP list for MVP and MV difference (MVD), etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, performing symmetric merge mode MV encoding, generating merge candidate lists, encoding motion vectors (MVs) for motion compensated prediction (MCP), generating symmetric merge candidates for regular and affine inter prediction, generating history-based MVP (HMVP) merge candidates, performing an MV refinement search of bi-prediction MVs), utilizing look-up-tables (LUTs) to solve for affine model parameter values, and/or encoding an index of an MVP list for MVP and MV difference (MVD), etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on merge mode (e.g., merge_flag and merge_index), coding syntax on affine merge mode (e.g., merge_ subblock_flag and/or merge_subblock_index), etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various examples refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, a size of a merge candidate list, a coded merge candidate index of a merge MV prediction candidate list, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Many examples are described herein. Features of examples may be provided alone or in any combination, across various claim categories and types. Further, examples may include one or more of the features, devices, or aspects described herein, alone or in any combination, across various claim categories and types.

Video coding systems may be used to compress digital video signals, which may reduce the storage needs and/or the transmission bandwidth of video signals. Video coding systems may include block-based, wavelet-based, and/or object-based systems.

A block-based hybrid coding architecture may combine inter-picture and intra-picture prediction and transform coding with entropy coding. One or more coding aspects may be implemented (e.g. for coding efficiency), including, for example, one or more of: (i) coding structure, (ii) intra prediction, (iii) inter prediction, transform, quantization and coefficients coding, (iv) in loop filter, and/or (v) screen content coding.

Coding structure may be implemented, for example, with multi-type tree block partitioning, such as quad-tree, binary tree and ternary tree partitioning.

Intra prediction may be implemented, for example, with 65 angular intra prediction directions, e.g., including one or more of wide angle prediction and/or linear model (LM) chroma mode.

Inter prediction may be implemented, for example, with one or more of an affine motion model, sub-block temporal motion vector prediction (SbTMVP), adaptive motion vector precision, decoder-side motion vector refinement (DMVR), triangular partitions, combined intra and inter prediction (CIIP), merge mode with motion vector difference (MMVD), bi-directional optical flow (BDOF), and/or bi-predictive weighted averaging (BPWA).

Transform, quantization and coefficients coding may be implemented, for example, with one or more of the following: multiple primary transform selection with discrete cosine transform (DCT)2, discrete sine transform (DST)7 and DCT8, dependent quantization with max quantization parameter (QP) increased from 51 to 63, and/or modified transform coefficient coding.

In loop filters may be implemented, for example, with a generalized adaptive loop filter (GALF). Screen content coding may be implemented, for example, with intra Block Copy (IBC). 360-degree video coding may be implemented, for example, with horizontal wrap-around motion compensation.

Different MV coding modes (e.g., a merge mode and an advanced motion vector prediction (AMVP) mode) may be implemented, for example, to encode motion vectors (MVs) for motion compensated prediction (MCP). In merge mode, coded MVs from neighboring PUs (e.g., spatially and/or temporally neighboring PUs) may be collected to create a merge MV candidate list. An index to the list may be coded and/or transmitted to the decoder. In AMVP mode, MVs candidates from neighboring PUs may be used as MV predictors (MVPs) and additional MV differences (MVDs) may be coded.

Continuity of motion trajectory may be assumed and exploited (e.g., for coding efficiency), for example, for pictures that allow bi-directional prediction. Symmetric MVD mapping may, for example, code an MVD for forward prediction and derive an MVD for backward prediction from the forward prediction (e.g., via symmetric mapping). A symmetric MVD mapping may be used (e.g. in DMVR), for example, to perform an MV refinement search of bi-prediction MVs (e.g., at the decoder side).

Symmetric mapping may be used in merge mode MV coding. Merge mode MV candidates may be collected or constructed. For example, merge candidates may include one or more of the following: coded MVs from spatially neighboring CUs, coded MVs from a temporally collocated CU, constructed MVs from a spatially neighboring CU (e.g., for affine motion mode), MVs from previously coded CUs, pair wise averaged MVs from top candidates of an existing merge candidate list, constructed symmetric bi-directional prediction (bi-pred) MVs, and zero MVs.

Symmetric bi-prediction (bi-pred) MVs may be constructed from available (e.g., existing) candidates in a merge candidate list. The continuity of motion may be leveraged, for example, when coding a picture that allows for bi-directional prediction, which involves motion compensated prediction (MCP) from reference pictures before and after a current picture. An available MV merge candidate may be symmetrically extended/mapped in either direction (e.g., backward or forward between reference pictures), for example, when coding a picture allowing for bi-directional prediction. A constructed symmetric bi-pred merge candidate may be used (e.g. in a merge candidate list) as an MV merge candidate for an encoder or decoder to choose from. A symmetric bi-pred MV candidate may be selected (e.g. to code as an MV for a current PU), for example, if motion continuity holds. A decoder may repeat symmetric mapping construction implemented by an encoder, for example, to obtain a coded MV. A coded index of an MV merge candidate list may be provided to and used by a decoder, for example, to generate a merged candidate list and/or a coded MV. Coding efficiency may be improved without incurring a coding bit cost, for example, by constructing and adding symmetric bi-pred MVs to merge candidate lists.

The method(s) described herein may be performed by a decoder. In some examples, the method(s) herein or a corresponding method(s) may be performed by an encoder. A computer-readable medium may include instructions for causing one or more processors to perform the method(s) described herein. A computer program product including instructions which, when the program is executed by one or more processors, may cause the one or more processors to carry out the method(s) described herein.

Merge mode MV coding may be performed (e.g., for a coding block (CB) or prediction unit (PU)). For example, an MV of a CB or PU may be encoded in a merge mode or an AMVP mode. In merge mode, coded MVs for neighboring PUs may be collected as MV candidates in a merge candidate list (e.g. to code a current PU). An index of the candidate list may be coded and transmitted to a decoder. A decoder may reproduce MV candidates (e.g., based on the coded index), for example, to use for MCP of the PU. In AMVP mode, neighboring coded MVs may be used as MVPs (e.g., in an AMVP candidate list (AMVPCL)). An encoder may encode (e.g., for a decoder) an index of an MVP list and the (e.g., remaining) MV differences (MVDs).

Merge mode may be used for regular translational motion model based MCP and/or for affine motion model based MCP.

Merge mode of regular inter prediction may be performed. In regular inter prediction merge mode (e.g., non-affine translational motion model based MCP), a merge candidate list may be constructed, for example, with one or more of the following types of candidates (e.g., in order): spatial MVP from spatial neighbour coding units (CUs), temporal MVP from collocated CUs, history-based MVP from a First-In-First-Out (FIFO) table, pairwise average MVP, symmetric bi-pred MV(s), and/or zero MVs.

A size of a merge list may be signaled, for example, in a slice header. A merge list may have a maximum size (e.g., a maximum number of candidates). In an example, a maximum size of a merge list may be, for example, six. Other examples may have a different maximum or may not have a maximum number of candidates. An index of a best merge candidate may be encoded, for example, for a (e.g., each) CU coded in merge mode. Different categories of merge candidates may have different generation procedures.

Merge candidates may include spatial candidates. Spatial merge candidates may be derived. In an example, (e.g., a maximum of four) merge candidates may be selected among candidates located in the positions depicted in FIG. 5.

Figure 5:
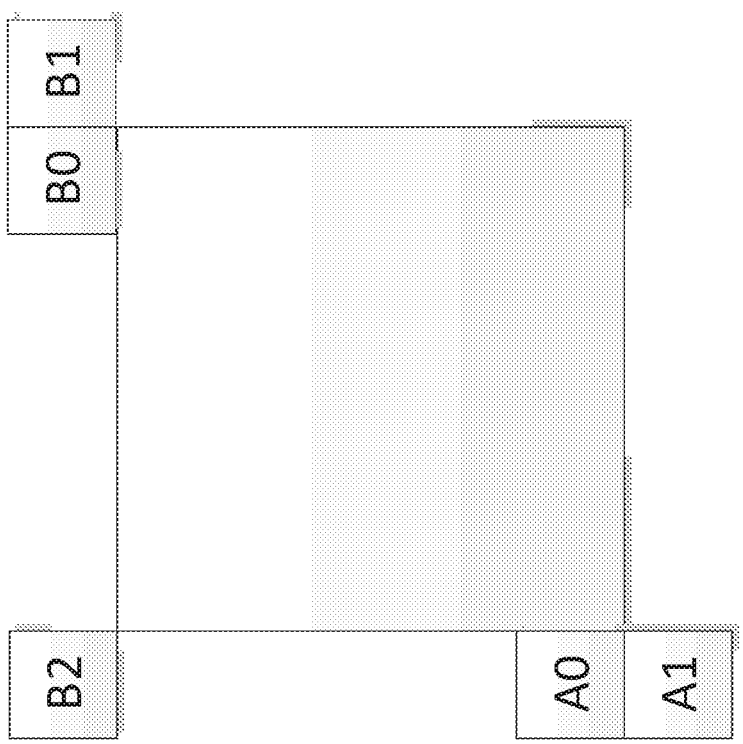
FIG. 5 is a diagram showing example positions of spatial merge candidates.

FIG. 5 is a diagram showing example positions of spatial merge candidates. The order of derivation may be, for example, $A_1$, $B_1$, $B_0$, $A_0$ and $B_2$. Position $B_2$ may be considered, for example, when (e.g., only when) CU(s) of position $A_1$, $B_1$, $B_0$, $A_0$ is/are not used and/or is/are intra coded. CU(s) of position $A_1$, $B_1$, $B_0$, $A_0$ may not be used, for example, when the CU(s) of position $A_1$, $B_1$, $B_0$, $A_0$ belong(s) to another slice or tile or is/are otherwise not available. The one or more of the CUs of position $A_1$, $B_1$, $B_0$, AP may not provide an MV candidate for a merge mode of a current CU, for example, if one or more of the CUs of position $A_1$, $B_1$, $B_0$, $A_0$ is available but intra coded. Addition of candidates may be subject to a redundancy check, for example, after a first candidate (e.g., at position $A_1$) is added. A redundancy check may remove (e.g., from a merge candidate list) redundant candidates with the same motion information. A redundancy check may consider selected candidate pairs (e.g. to reduce computational complexity).

Merge candidates may include temporal candidates. In an example, a (e.g., only one) temporal MVP (TMVP) candidate may be added to a merge candidate list. A temporal merge candidate may be derived. A scaled motion vector (e.g., for a temporal merge candidate) may be derived, for example, based on co-located CU(s) belonging to a collocated reference picture. The reference picture list to be used for derivation of the co-located CU may be indicated, for example, by explicit signaling, e.g., in the slice header. A scaled motion vector for a temporal merge candidate may be obtained, for example, as illustrated by the dotted line in FIG. 6.

Figure 6:
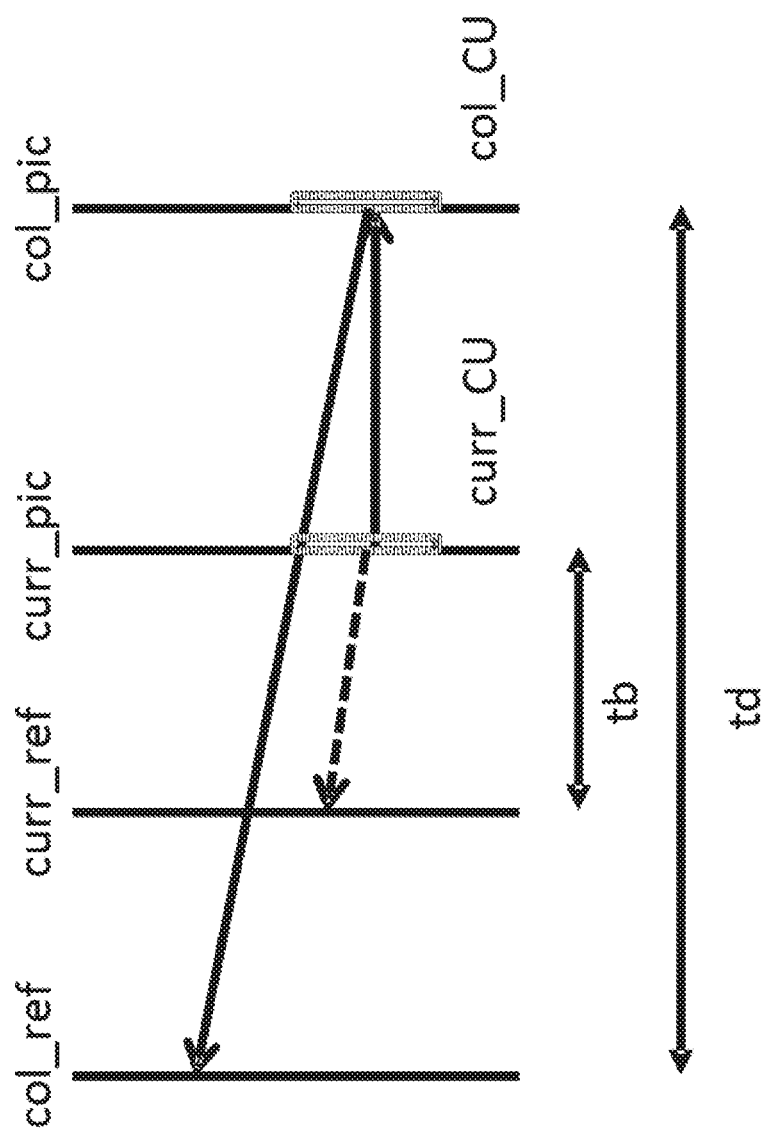
FIG. 6 is a diagram showing an example of motion vector scaling for a temporal merge candidate.

FIG. 6 is a diagram showing an example of motion vector scaling for a temporal merge candidate. A scaled motion vector for a temporal merge candidate may be scaled, for example, based on a motion vector for the co-located CU, e.g., using POC (Picture Order Count) distances, tb and td. POC distance tb may indicate a POC difference between the current picture and a reference picture of the current picture. POC distance td may indicate a POC difference between the collocated picture and a reference picture of the co-located picture. The reference picture index of the temporal merge candidate may be set equal to zero. The position for the temporal candidate may be selected, for example, between collocated center candidate CU and collocated bottom-right CU.

Merge candidates may include history-based merge candidates. History-based MVP (HMVP) merge candidates may be added to a merge candidate list, for example, after spatial MVP and TMVP merge candidates. Motion information of a previously coded block may be stored in a table and/or used as MVP for a current CU. A previously coded block may or may not be from immediate neighbor CUs. A table with multiple HMVP candidates may be maintained, e.g., during an encoding/decoding process. The table may be reset (e.g., by emptying the table), for example, when a different coding tree unit (CTU) row is (e.g., first) encountered. Motion information may be added to the last entry of the table (e.g., as a new HMVP candidate), for example, if (e.g., when) there is a non-subblock inter-coded CU (e.g., for an affine mode).

HMVP table size S may be limited to a maximum number of table entries. In an example, HMVP table size S may be set to be 6, which may indicate up to 6 HMVP candidates may be added to the table. A constrained first-in-first-out (FIFO) rule may be utilized, for example, when inserting a (e.g., new) motion candidate into the table. A redundancy check may be applied to determine whether there is an identical HMVP in the table. An identical (e.g. redundant) HMVP may be removed from the table. HMVP candidates may be moved forward, for example, when a candidate is removed.

HMVP candidates (e.g., in an HMVP table) may be used in a merge candidate list construction process. HMVP candidates (e.g., in the table) may be checked (e.g., in order), for example, to determine whether an HMVP candidate should become a merge candidate. An HMVP candidate may be inserted into a merge candidate list, for example, after a TMVP candidate. A redundancy check may be applied, for example, to determine whether the HMVP candidate(s) is/are redundant, e.g., relative to spatial or temporal merge candidates. In an example, the number of redundancy check operations may be reduced.

Merge candidates may include pair-wise average merge candidates. Pairwise average candidates may be generated, for example, by averaging predefined pairs of candidates in the available (e.g., existing) merge candidate list. Predefined pairs may be defined as, for example, {(0, 1), (0, 2), (1, 2), (0, 3), (1, 3), (2, 3)}. The numbers may denote merge indices to the merge candidate list. The averaged motion vectors may be calculated, for example, separately for each reference list. Two (e.g. both) motion vectors available in one reference list may be averaged, for example, even when the motion vectors point to different reference pictures. If only one motion vector is available, the motion vector may be used directly. If no motion vector is available, the list may be invalid.

Merge candidates may include symmetric bi-pred motion vectors. Construction of symmetric bi-pred motion vectors is discussed in greater detail below.

Merge candidates may include zero MVPs. A merge list may not be full after symmetric bi-pred MV merge candidates are added to the merge list. Zero MVPs may be inserted at the end of a merge candidate list, for example, up to a maximum number of merge candidates.

Affine motion compensated prediction may be performed. Block-based affine transform motion compensation prediction (MCP) may be applied (as described herein), for example, for many kinds of motion, e.g., zoom in/out, rotation, perspective motions and other irregular motion.

Figure 7C:
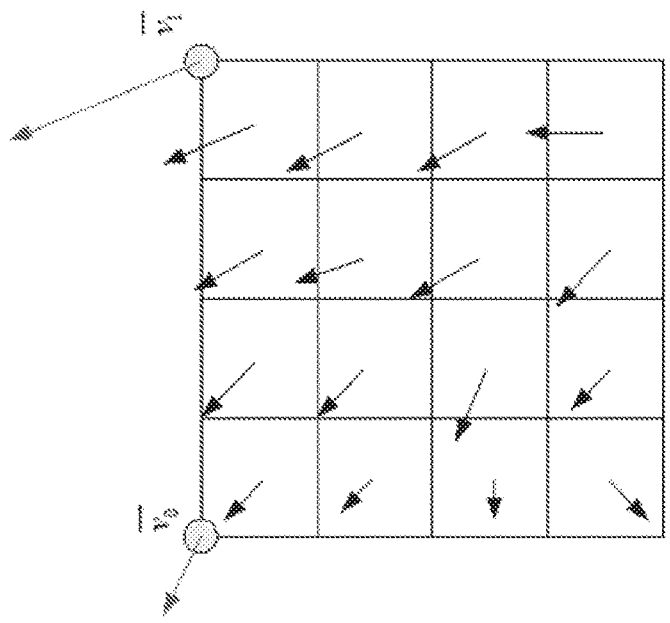
FIGS. 7A-C are diagrams showing examples of control point based affine motion models including a 4 parameter affine model, a 6 parameter affine model, and an affine motion vector field per sub-block.
Figure 7B:
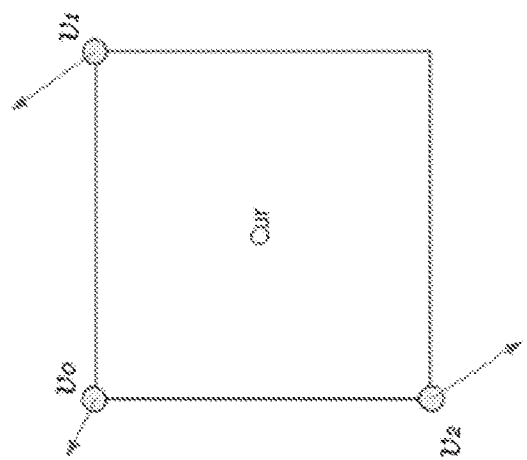
Figure 7A:
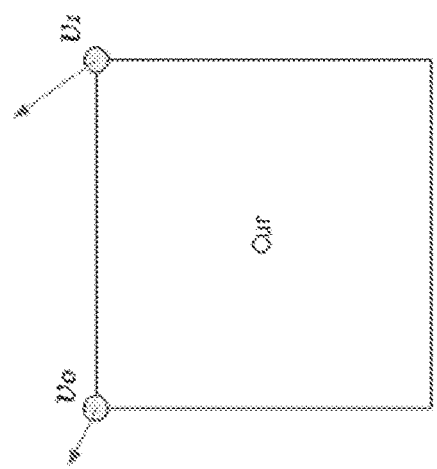

FIG. 7A-C are diagrams showing examples of control point based affine motion models, including a 4 parameter affine model, a 6 parameter affine model, and an affine motion vector field (MVF) per sub-block. An affine motion field of a block may be described by motion information of two control point (e.g., 4-parameter) or three control point (e.g., 6-parameter) motion vectors.

For a 4-parameter affine motion model (e.g., as shown in FIG. 7A), a motion vector at sample location (x, y) in a block may be derived, for example, using Eq. 1:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad \text{Eq. 1}$$

For a 6-parameter affine motion model (e.g., as shown in FIG. 7B), a motion vector at sample location (x, y) in a block may be derived, for example, using Eq. 2:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0x}}{H}y + mv_{0y} \end{cases} \quad \text{Eq. 2}$$

With reference to FIGS. 7A and 7B and to Eq. 1 and Eq. 2, a motion vector of the top-left corner control point $v_0$ may be indicated by ($mv_{0x}$, $mv_{0y}$). A motion vector of the top-right corner control point $v_1$ may be indicated by ($mv_{1x}$, $mv_{1y}$). A motion vector of the bottom-left corner control point $v_2$ may be indicated by ($mv_{2x}$, $mv_{2y}$).

Block based affine transform prediction may be applied, for example, to simplify the motion compensation prediction. A motion vector of the center sample of a sub-block may be calculated to derive motion vector for a 4×4 luma sub-block. In an example, as shown in FIG. 7C, a motion vector of the center sample of each sub-block may be calculated according to Eq. 1 and/or Eq. 2, for example, to derive a motion vector for each 4×4 luma sub-block. A motion vector may be rounded to 1/16 fraction accuracy. Motion compensation interpolation filters may be applied, for example, to generate a prediction for a (e.g., each) sub-block with a derived motion vector. The sub-block size of chroma-components may be set to be 4×4, for example. The MV of a 4×4 chroma sub-block may be calculated, for example, as the average of the MVs of four corresponding 4×4 luma sub-blocks.

There may be multiple affine motion inter prediction modes (e.g., including affine merge mode and affine AMVP mode), for example, similar to multiple modes of translational motion inter prediction.

Merge mode for affine prediction may be performed. Affine merge mode may be applied for CUs having, for example, width and height larger than or equal to 8. In affine merge mode, control point MVs (CPMVs) for a current CU may be generated, for example, based on motion information for spatial neighboring CUs. The number of CPMVP candidates may be limited (e.g., to a maximum number of candidates). In an example, there may be one or more (e.g., up to five) CPMVP candidates. An index may be signaled (e.g., by an encoder to a decoder) to indicate a CPMVP candidate to be used for a current CU. An affine merge candidate list may include one or more of the following types of CPMV candidates: inherited affine merge candidates that may be extrapolated from the CPMVs of neighbor CUs, constructed affine merge candidate CPMVPs that may be derived using the translational MVs of neighbor CUs, constructed symmetric affine merge candidates that may be derived by a symmetric mapping of existing affine merge candidates, and/or zero MVs.

Inherited affine merge candidates may be used for affine prediction. The number of inherited affine merge candidates may be limited. In an example, there may be a maximum of two inherited affine candidates in an affine merge candidate list. Inherited affine candidates may be derived, for example, from an affine motion model of neighboring blocks (e.g., one from left neighboring CUs and one from above neighboring CUs).

Figure 8B:
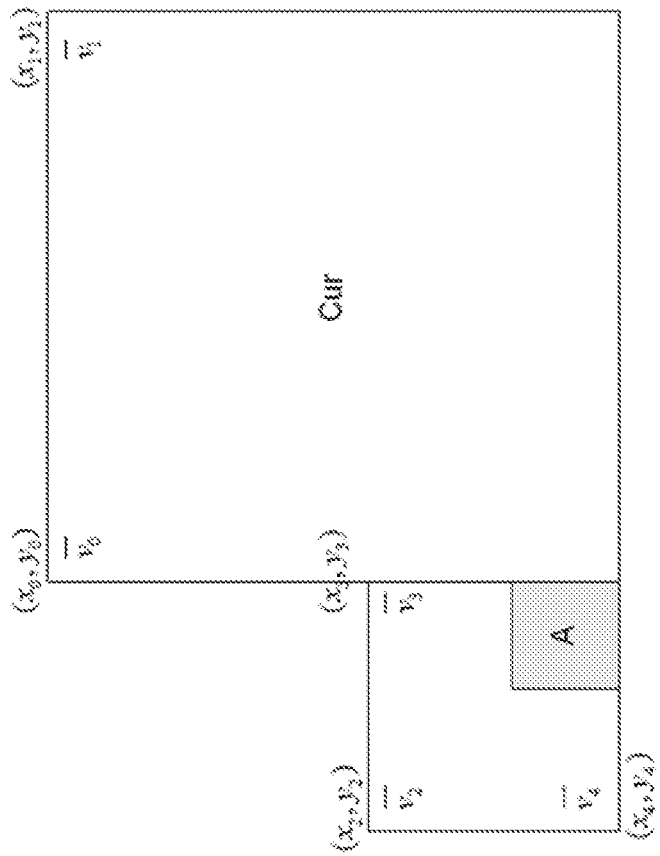
FIGS. 8A and 8B are diagrams showing example locations of inherited affine motion predictors and examples of control point motion vector inheritance.
Figure 8A:
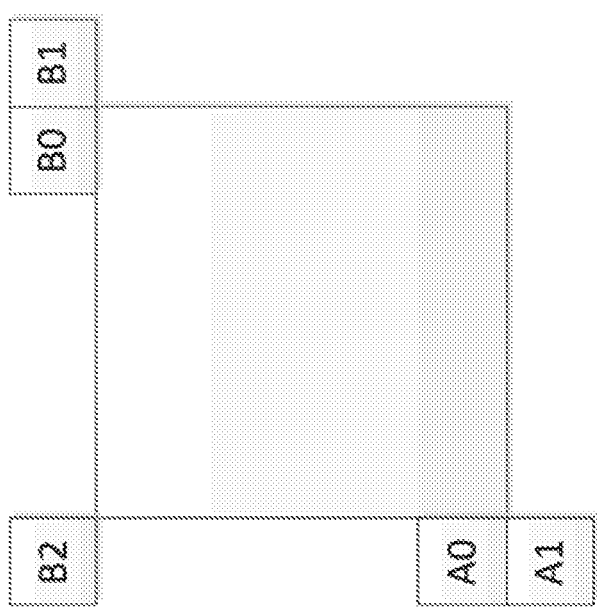

FIGS. 8A and 8B are diagrams showing example locations of inherited affine motion predictors and examples of control point motion vector inheritance. FIG. 8A shows example candidate blocks. In an example (e.g., for the left predictor), the scan order may be A0 to A1. In an example (e.g., for the above predictor), the scan order may be B0 to B1 to B2. In an example, the first inherited candidate from each side may be selected. Pruning check may not be performed between two inherited candidates. In an example (e.g., when a neighboring affine CU is identified), a neighboring affine CU's control point motion vectors may be used, for example, to derive the CPMVP candidate in the affine merge list of the current CU. In an example (e.g., when, as shown in FIG. 8B, a neighbour left bottom block A is coded in an affine mode), motion vectors $v_2$, $v_3$ and $v_4$ (e.g., of the top left corner, above right corner and left bottom corner of the CU that contains block A) may be attained. Two CPMVs of a current CU may be calculated, e.g., according to $v_2$ and $v_3$, for example, if block A is coded with a 4-parameter affine model. Three CPMVs of a current CU may be calculated, e.g., according to $v_2$, $v_3$ and $v_4$, for example, if block A is coded with a 6-parameter affine model.

Constructed affine candidates may be used for affine prediction. An affine candidate may be constructed, for example, by combining neighbor translational motion information from a (e.g., each) control point.

Figure 9:
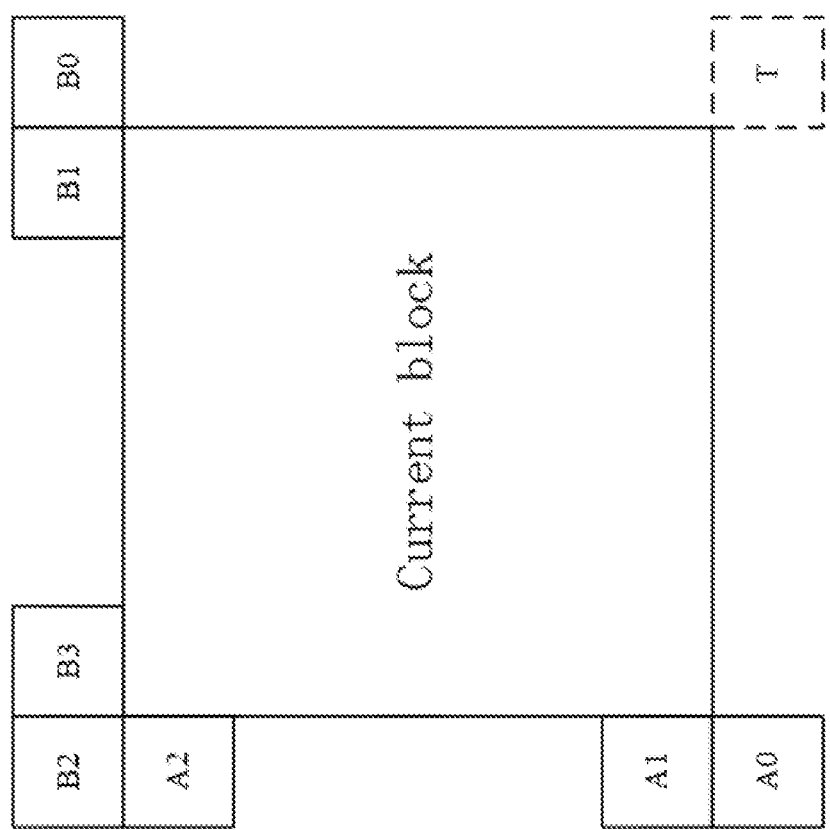
FIG. 9 is a diagram showing example locations of candidate positions for constructed affine merge mode.

FIG. 9 is a diagram showing example locations of candidate positions for constructed affine merge mode. Motion information for the control point(s) may be derived from specified spatial neighbors and temporal neighbors (e.g., shown by example in FIG. 9). $CPMV_k$ (k=1, 2, 3, 4) may represent the k-th control point. In an example (e.g. for $CPMV_1$), blocks may be checked for availability in an order (e.g., block B2 then B3 then A2). The MV of the first available block may be used. In an example (e.g., for $CPMV_2$), blocks may be checked for availability in order (e.g., block B1 then B0). In an example (e.g., for $CPMV_3$), blocks may be checked for availability in order (e.g., block A1 then A0). TMVP may be used as $CPMV_4$, for example, if TMVP is available.

Affine merge candidates may be constructed based on the motion information, for example, after MVs of the four control points are attained. Combinations of control point MVs may be used to construct the following (e.g., in order):

{CPMV$_1$, CPMV$_2$, CPMV$_3$}, {CPMV$_1$, CPMV$_2$, CPMV$_4$}, {CPMV$_1$, CPMV$_3$, CPMV$_4$}, {CPMV$_2$, CPMV$_3$, CPMV$_4$}, {CPMV$_1$, CPMV$_2$}, {CPMV$_1$, CPMV$_3$}

A combination of three CPMVs may construct a 6-parameter affine merge candidate. A combination of two CPMVs may construct a 4-parameter affine merge candidate. The related combination of control point MVs may be discarded, for example, if reference indices of control points are different, e.g., to avoid a motion scaling process.

Constructed symmetric affine merge candidates may be used for affine prediction. Constructed symmetric affine merge candidates may be derived by a symmetric mapping of existing affine merge candidates. Constructed symmetric affine merge candidates are discussed in greater detail below.

Zero MVs may be used for affine prediction. Zero MVs are inserted at the end of an affine merge candidate list, for example, if the list is still not full, for example, after other constructed affine merge candidates are checked, such as constructed symmetric affine merge candidates.

Symmetric MV Difference (MVD) for bi-prediction may be performed. A motion vector in forward and backward reference pictures may be symmetric, for example, due to the continuity of motion trajectory in bi-directional prediction. Symmetric motion vector difference (MVD) may include an inter coding mode that uses the continuity of motion trajectory in bi-prediction. In a symmetric MVD mode, the MVD of reference picture List 1 may be symmetric to the MVD of List 0. In an example, (e.g., only) the MVD of reference picture List 0 may be signaled (e.g., for coding efficiency). An MV coded for a current picture in a symmetric MVD mode may be derived, for example, using Eq. 3:

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad \text{Eq. 3}$$

Subscripts in Eq. 3 may indicate reference list 0 or 1. Directions may be indicated by x and y (e.g., x may indicate horizontal direction and y may indicate vertical direction).

Symmetric MVD mode may be available for bi-prediction, for example, when either of the following are true: (i) reference list 0 contains a forward reference picture and reference list 1 contains a backward reference picture; and/or (ii) reference list 0 contains a backward reference picture and reference list 1 contains a forward reference picture.

In an example, reference picture indices of reference list 0 and list 1 may not be signaled, e.g. in a symmetric MVD mode. Reference picture indices of reference list 0 and list 1 may be derived, for example, in a symmetric MVD mode.

In an example (e.g., if reference list 0 contains forward reference picture and reference list 1 contains backward reference picture), the reference picture index in list 0 may be set to the nearest forward reference picture relative to the current picture, and the reference picture index of list 1 may be set to the nearest backward reference picture relative to the current picture. In an example (e.g., if reference list 0 contains backward reference picture and reference list 1 contains forward reference picture), the reference picture index in list 0 may be set to the nearest backward reference picture relative to the current picture, and the reference picture index of list 1 may be set to the nearest forward reference picture relative to the current picture.

Symmetric MVD may reduce signaling overhead and/or coding complexity. For example, symmetric MVD mode may avoid signaling a reference picture index for both reference picture lists. Symmetric MVD mode may signal (e.g., only) one set of MVD for one list (e.g., list-0).

Decoder side motion vector refinement (DMVR) may be performed. Bilateral-matching (BM) based decoder side motion vector refinement may be applied, for example, to increase the accuracy of the MVs of a merge mode. A refined MV may be searched around initial MVs in reference picture list L0 and/or reference picture list L1, for example, in a bi-prediction operation. BM may calculate a distortion between two candidate blocks in reference picture list L0 and list L1.

Figure 10:
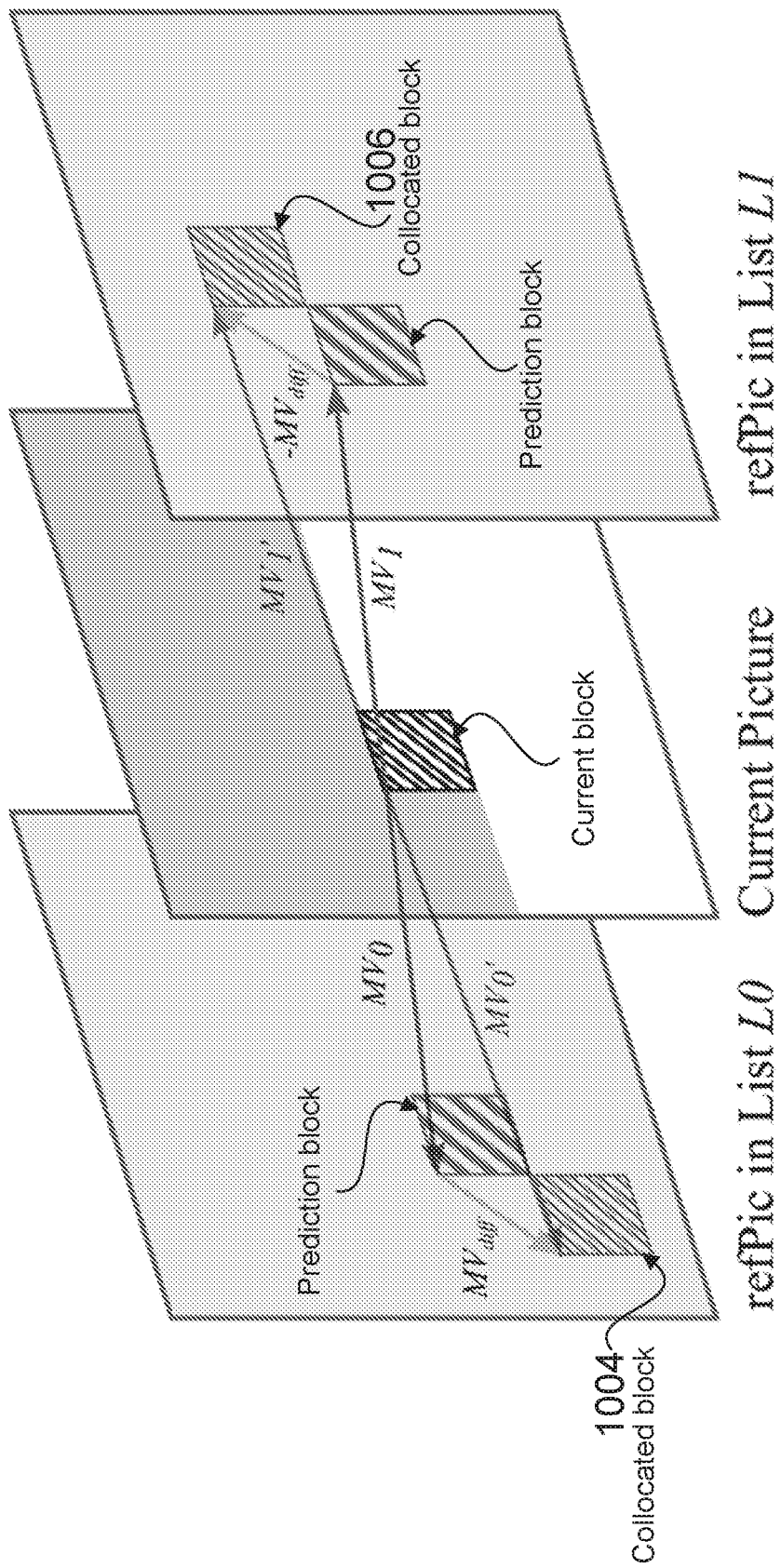
FIG. 10 is a diagram showing an example of decoder side motion vector refinement.

FIG. 10 is a diagram showing an example of decoding side motion vector refinement. As illustrated in FIG. 10, the sum of absolute difference (SAD) between blocks 1004 and 1006 may be calculated, for example, based on each MV candidate around the initial MV. The MV candidate with the lowest SAD may become the refined MV and/or may be used to generate the bi-predicted signal.

The refined MV (e.g., derived by the DMVR process) may be used to generate inter prediction samples and/or may be used in temporal motion vector prediction for future picture coding. The original MV may be used in a deblocking process and/or may be used in spatial motion vector prediction for future CU coding.

As shown in FIG. 10, search points may surround the initial MV. The MV offset may obey an MV difference mirroring (e.g., symmetric) rule. Points may be checked by DMVR (e.g., denoted by candidate MV pair (MV0, MV1)), for example, in accordance with Eq.4:

$$\begin{cases} MV0' = MV0 + MV_{offset} \\ MV1' = MV1 - MV_{offset} \end{cases} \quad \text{Eq. 4}$$

MV$_{offset}$ may represent the refinement offset between the initial MV and the refined MV, for example, in one of the reference pictures. The refinement search range may be, for example, two integer luma samples from the initial MV. Search complexity may be reduced, for example, by using a fast searching method with an early termination trigger.

A merge mode MV candidate may be constructed for PUs (e.g., that allow bi-directional prediction). A merge mode MV candidate may be constructed, for example, via symmetric mapping of a (e.g., an existing) candidate MV from one direction to the other (e.g., from a forward reference picture to a backward reference picture and vice versa). Merge mode MV candidates may be constructed, for example, for a regular inter prediction merge mode and/or for an affine prediction merge mode. Symmetric MV candidate construction via symmetric mapping may be used, for example, if motion trajectory is continuous across video frames.

Figure 11A:
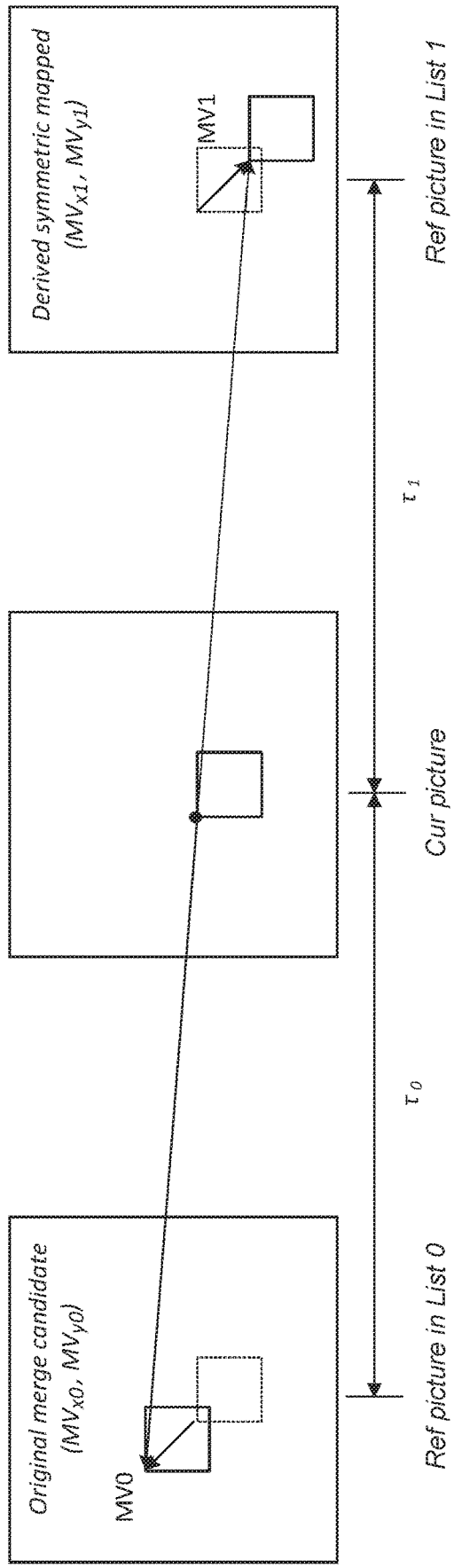
FIGS. 11A and 11B are diagrams showing examples of symmetric merge MV candidate construction for regular and affine motion.

FIG. 11A is a diagram showing an example of symmetric merge MV candidate construction for regular motion. In an example (e.g., as shown in FIG. 11), an original merge MV candidate (MVx0, MVy0) may use a reference picture in List 0. A symmetric mapping of the MV in the other reference picture List 1 may be derived from original merge MV candidate (MVx0, MVy0). The derived symmetric mapped MV candidate may be (MVx1, MVy1). The MVs in short arrowed lines may indicate MV magnitudes. The long arrowed lines may illustrate a motion trajectory across pictures (e.g., from a reference picture in List 0 to the current picture and/or from the current picture to a reference picture in List 1). $\tau_0$, $\tau_1$ may represent temporal distances (e.g. POC distances) between the reference picture in List 0 and the current picture or between the current picture and the reference picture in List 1, respectively. In an example, translational motion vectors MV0 and MV1 (e.g., short arrowed lines) may indicate symmetric translational motion vectors (e.g., MV1=−MV0).

A symmetric merge candidate may be constructed (e.g., from available merge candidates) for regular inter prediction. A merge candidate list (e.g., an available merge candidate list) may include, for example, one or more of the following: spatial neighbor MVs, temporal collocated MV, history MVPs, pair-wise average MVs, and/or zero MVs. In examples, one or more symmetric bi-prediction MV candidate(s) may be located, for example, (i) after non-zero MVs and before zero MVs, (ii) after history MVPs and before pair-wise average MVs, and/or (iii) after temporal collocated MVs and before history MVPs. The location of the symmetric bi-prediction MV candidate(s) may depend on, for example, testing results. Locating right before zero MVs may be the most conservative location.

A symmetric merge candidate may be used for PUs that allow bi-directional prediction. For example, a symmetric merge candidate may be used for PUs for a tile group type B and/or for a B-slice/picture.

Symmetric MV candidates may be constructed and/or added based on available (e.g., existing) merge candidates. Example procedures are provided herein to construct symmetric merge MV candidates (e.g. based on available merge candidates).

In an example, the following example procedure may be implemented for an (e.g. each) available (e.g., existing) merge MV candidate (e.g., candidate i), in the merge candidate list (e.g., starting from the top candidate).

An existing merge mode MV candidate in a merge candidate list (e.g., merge candidate i) may have horizontal MvCand$_{i,x}$, vertical MvCand$_{i,y}$, prediction reference picture list refPicList, reference picture index refPicIdx, and reference picture order count (POC) refPicPoc. A determination may be made whether candidate i is a uni-directional prediction (uni-pred) MV. A determination may be made (e.g., for uni-pred MV i) whether there is a reference picture in a different reference picture list (e.g., List (1−refPicList)) that is of equal POC distance to the current picture, the current tile group, or the current slice as the POC distance between the current picture and the picture list referenced by merge candidate i. For example, a determination may be made whether Eq. 5 is true:

$$\text{refPicPocCand}_i - \text{curPicPoc} == \text{curPicPoc} - \text{refPicPocSym}_j \qquad \text{Eq. 5}$$

where refPicPocCand$_i$, curPicPoc, and refPicPocSym$_j$ may, respectively, denote a POC of the reference picture of the merge candidate i (e.g., candidate being evaluated), POC of the current picture/slice, and POC of a reference picture j from the different reference picture list (e.g., List (1−refPicList)).

A symmetric bi-pred MV candidate may be created for merge candidate i, for example, if a symmetric reference picture with an equivalent POC is included in the different reference picture list (e.g., List (1−refPicList)). Uni-pred merge candidate MV (e.g. merge candidate i) may be denoted refPicList MV. A symmetric bi-pred MV candidate derived from refPicList MV may be denoted (1−refPicList) MV), indicating an MV in a prediction direction opposing the prediction direction of the uni-pred merge candidate MV.

The symmetric bi-pred MV candidate may be derived as the symmetrical mapping of the uni-pred candidate MV, for example, using Eq. 6:

$$\text{MvSym}_{i,x} = -\text{MvCand}_{i,x}, \quad \text{MvSym}_{i,y} = -\text{MvCand}_{i,y} \qquad \text{Eq. 6}$$

A symmetric MV candidate may be added to the merge candidate list, for example, based on one or more factors/criterion, such as one or more conditions. In an example, a symmetric bi-pred merge candidate may be added to a merge candidate list if: (i) the symmetric bi-pred candidate (e.g., the newly created symmetric bi-pred candidate) is not already in the merge candidate list (e.g. is not redundant with a candidate in the list); (ii) the total number of available merge candidates in the list is less than the maximum number of allowed merge candidates; and (iii) the total number of symmetric merge candidates in the merge candidate list is less than the maximum number of allowed symmetric merge candidates. In an example, the symmetric MV candidate may not be added to the merge candidate list, for example, if (i), (ii) or (ii) in the example is not true.

A determination may be made whether candidate i is a bi-pred MV. In an example (e.g., where candidate i is a bi-pred MV), candidate i's MVs associated with the two reference picture lists may be considered separately as two individual (e.g., different) uni-pred candidates. The foregoing symmetric mapping procedure to construct a symmetric bi-pred candidate (e.g., and conditionally add to the merge candidate list) may be applied to each of the two individual uni-pred candidates. The symmetric mapping applied to the two individual uni-pred candidates may generate two different symmetric merge candidates. A determination whether to add the two different symmetric merge candidates may be made individually, e.g., applied separately to each symmetric merge candidate.

The procedure checking each existing merge candidate in the merge candidate list may stop, for example, if the maximum number of needed merge candidates and/or the maximum number of allowed symmetric merge candidates is reached. The next available candidate in the list may be processed, e.g., as candidate i is processed as described herein, for example, if the maximum number of needed merge candidates and the maximum number of allowed symmetric merge candidates are not reached. Added (e.g., newly added) symmetric candidates may not be processed, for example, as candidate i is processed as described herein.

In examples, the symmetric reference picture (e.g., equal POC distance) condition may be based on the closest POC distance, for example, rather than an equivalent POC distance, to consider whether to generate a symmetric bi-pred merge candidate for an existing merge candidate. In an example, a closest POC may comprise an equivalent POC (e.g., with zero difference). Whether a conditional POC distance is equal, closest to or another distance may depend on, for example, testing results. In an example, checking the different (e.g., the other) reference list as described herein may comprise searching for a reference picture that provides the closest POC distance to the current picture to meet the equal POC distance condition (e.g., as provided in Eq. 5). For example, Eq. 7 may be used:

$$\min_j(|\text{refPicPocSym}_j - (2 \cdot \text{curPicPoc} - \text{refPicPocCand}_i)|) \qquad \text{Eq. 7}$$

In examples (e.g., where Eq. 7 is used), MV scaling may be applied, for example, based on different POC distances to the current picture. In an example, MV scaling may be applied in accordance with Eq. 8:

$$MvSym_{i,x} = -\alpha \cdot MvCand_{i,x}, MvSym_{i,y} = -\alpha \cdot MvCand_{i,y} \quad \text{Eq. 8}$$

$$\alpha = \frac{curPicPoc - refPicPocSym_j}{refPicPocCand_i - currPicPoc}$$

In examples, the maximum number of allowed symmetric merge candidates may be set to 1 or 2, for example. A maximum number of symmetric merge candidates may depend on, for example, testing results.

In examples, symmetric merge candidate construction (e.g., as described herein) may be applied, for example, to available (e.g., existing) uni-pred merge candidates (e.g., only to existing uni-pred merge candidates), bi-pred merge candidates (e.g., only to existing bi-pred merge candidates), and/or uni-pred or bi-pred merge candidates (e.g., to all existing candidates regardless whether uni-pred or bi-pred).

A symmetric merge candidate construction (e.g., as described herein) may be conducted at the encoder and/or the decoder sides. The decoder may produce the same symmetric merge candidate constructed by an encoder, for example, based on a coded merge candidate index of a merge candidate list. Adding a symmetric merge candidate to a merge candidate list (e.g., as described herein) may improve coding efficiency without incurring extra coding and/or signaling costs.

A coding syntax on merge mode (e.g., merge_flag and merge_index, etc.) may be provided. Merge candidate list construction may be provided. In an example, a symmetric merge candidate may be added in one or more locations in a merge candidate list (e.g., between a pair-wise average MV candidate and a zero MV candidate).

A symmetric merge candidate may be constructed for affine mode prediction. A merge mode may be used for affine mode MCP, for example. A merge candidate list for affine mode may be different from a merge candidate list for a regular inter prediction. In an example of affine mode prediction, merge candidates may include, for example, one or more of inherited affine merge candidates, constructed affine merge candidates, and/or zero MVs. Symmetric affine merge candidates (e.g., created as described herein) may be located, for example, after non-zero MV candidates and before zero MV candidates in an affine merge candidate list.

Figure 11B:
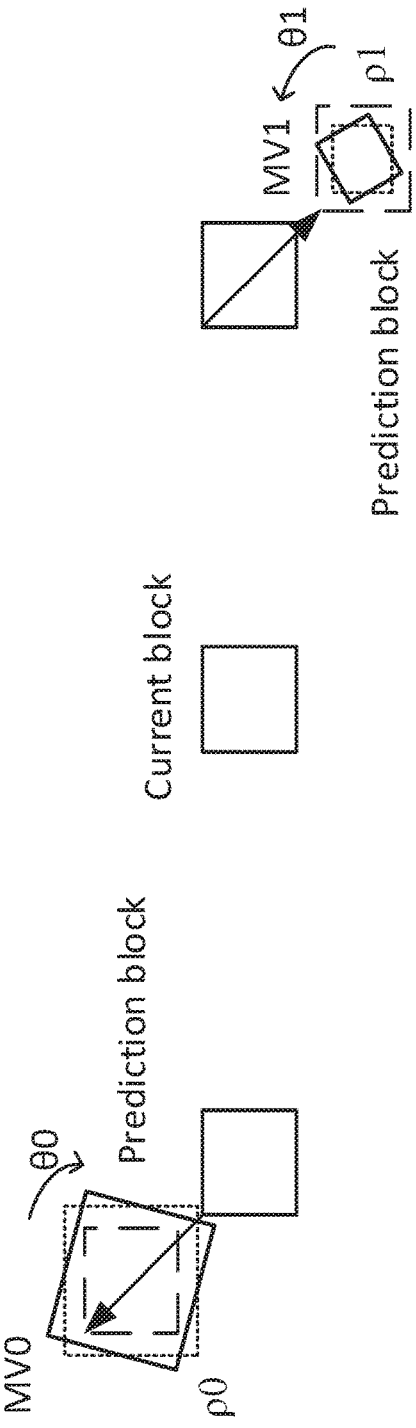

FIG. 11B is a diagram showing an example of symmetric merge MV candidate construction for affine motion. In an example (e.g., as shown in FIG. 11B), original affine merge candidate (e.g. with multiple MVs) may use a reference picture in List 0. A symmetric mapping of the MVs in the other reference picture List 1 may be derived from original affine merge candidate MVs. In an example, translational motion vectors MV0 and MV1 (e.g., short arrowed lines) may indicate symmetric translational motion vectors (e.g., MV1=−MV0). Rotational arrows denoted with rotation angles θ₀ and θ₁ may indicate symmetric rotation motion vectors (e.g., θ₁=−θ₀). Zooming factors ρ0 and ρ1 may indicate symmetric zooming motion vectors (e.g., ρ1=1/ρ0). Similar to FIG. 11A, τ₀, τ₁ may represent temporal distances (e.g. POC distances) between the reference picture in List 0 and the current picture or between the current picture and the reference picture in List 1, respectively.

In examples, symmetric affine merge candidate construction may be similar to symmetric merge candidate construction for regular inter prediction. Differences between symmetric mapping for affine mode and regular inter prediction are described below.

In an affine mode (e.g., for a uni-pred candidate), two or three control point MVs may be used for a 4-parameter and 6-parameter affine model, respectively (e.g., as described herein). A symmetric mapping (e.g., as shown in Eq. 6) may be applied for the top-left control point MV. The top-left control point MV may represent the same translational motion as an MV in regular inter prediction mode. MVs for the other (e.g., 1 or 2) control points (e.g., top-right and bottom-left control points) may follow different symmetric mapping calculations. MVs for the other 1 or 2 control points (e.g., top-right and bottom-left control points) may represent zooming and/or rotational motion information.

An affine motion model may be expressed, for example, in accordance with Eq. 9:

$$\begin{cases} MV_{(x,y)}^h = (\rho_x \cos\theta_x - 1) \cdot x + \rho_y \sin\theta_y \cdot y + d_x \\ MV_{(x,y)}^v = -\rho_x \sin\theta_x \cdot x + (\rho_y \cos\theta_y - 1) \cdot y + d_y \end{cases} \quad \text{Eq. 9}$$

As shown in Eq. 9, $MV_{(x,y)}^h$ and $MV_{(x,y)}^v$ may be the horizontal and vertical components of an MV at position (x, y), $d_x$, $d_y$ may be spatial translations, $\rho_x$, $\rho_y$ may be zooming factors, $\theta_x$, $\theta_y$ may be rotation angles, and x, y may represent horizontal and vertical directions, respectively. Eq. 9 may represent a 6-parameter affine motion model. A 4-parameter affine model may be consistent with Eq. 9 and Eq. 10:

$$\rho_x = \rho_y, \theta_x = \theta_y \quad \text{Eq. 10}$$

For example, in a 4-parameter affine model, MVs of two control points may be known from a uni-pred MV candidate. MVs of the two control points may include, for example, $(mv_x^0, mv_y^0)$ of the top-left control point 0 at (0,0) and $(mv_x^1, mv_y^1)$ of the top-right control point at (w, 0), where w may be the width of the CU. Plugging in the two positions and MVs into Eq. 9, combined with the assumption of Eq. 10, may yield Eq. 11 and Eq. 12:

$$mv_x^0 = d_x, mv_y^0 = d_y. \quad \text{Eq. 11}$$

$$\begin{cases} mv_x^1 = (\rho\cos\theta - 1) \cdot w + d_x \\ mv_y^1 = -\rho\sin\theta \cdot w + d_y \end{cases} \quad \text{Eq. 12}$$

Plugging Eq. 11 into Eq. 12 may yield Eq. 13:

$$\begin{cases} \rho \cdot \sin\theta = \frac{mv_y^1 - mv_y^0}{w} \\ \rho \cdot \cos\theta = \frac{mv_x^1 - mv_x^0}{w} + 1 \end{cases} \quad \text{Eq. 13}$$

In examples, look-up-tables (LUTs) may be used to solve for the values of one or more of ρ, sin θ, and/or cos θ, for example, so that the encoder and the decoder may yield the same calculation results. In an example, LUTs may be created using Eq. 14:

$$tab_1[a] = \left[N \cdot \sin\left(a\tan\left(\frac{a}{N}\right)\right)\right], tab_2[b] = \left[N \cdot \sin\left(a\tan\left(\frac{N}{b}\right)\right)\right] \quad \text{Eq. 14}$$

$$tab_3[a] = \left[N \cdot \cos\left(a\tan\left(\frac{a}{N}\right)\right)\right], tab_4[b] = \left[N \cdot \cos\left(a\tan\left(\frac{N}{b}\right)\right)\right]$$

As shown in Eq. 14, N may control precision (e.g., 256), a=0 . . . N, and b=1 . . . N. The square bracket used on the right side of Eq. 14 may denote rounding to the nearest integer.

In an example of symmetric mapping to a different prediction direction (e.g., the opposite prediction direction), the four affine model parameters $(d_x, d_y, \rho, \theta)$ may be (e.g., symmetrically) mapped to $(-d_x, -d_y, \rho^{-1}, -\theta)$. Symmetric mapping of the zooming ratio $\rho$ may be the inverse of zooming ratio $\rho$ (e.g. with reference to FIG. 11, $\rho 1=1/\rho 0$). The corresponding two control point MVs of the other reference picture list (e.g., from the opposite prediction direction) may be derived, for example, as shown in Eq. 15 and Eq. 16:

$$mvSym_x^0 = -d_x, mvSym_y^0 = -d_y. \qquad \text{Eq. 15}$$

$$\begin{cases} mvSym_x^1 = (\rho^{-1}\cos\theta - 1) \cdot w + d_x \\ mvSym_y^1 = \rho^{-1}\sin\theta \cdot w - d_y \end{cases} \qquad \text{Eq. 16}$$

As shown in Eq. 15 and Eq. 16, $(mvSym_x^0, mvSym_y^0)$, $(mvSym_x^1, mvSym_y^1)$ may denote the two control point MVs from the other prediction direction.

Starting from Eq. 9, a 4-parameter affine motion symmetric mapping process (e.g., as described herein) may be extended to solve and/or calculate the symmetric mapping MV of the bottom left control point for a 6-parameter affine model. In Eq. 17, $(mv_x^2, mv_y^2)$ may denote the bottom-left control point at $(0, h)$, where h is the height of the CU.

Plugging $(0, h)$ into Eq. 9 may yield Eq. 17:

$$\begin{cases} mv_x^2 = \rho_y \sin\theta_y \cdot h + d_x \\ mv_y^2 = (\rho_y \cos\theta_y - 1) \cdot h + d_y \end{cases} \qquad \text{Eq. 17}$$

In the 6-parameter affine model of Eq. 9, the herein derived $(\rho, \theta)$ in the 4-parameter model may become $(\rho_x, \theta_x)$, which denotes the zooming ratio and rotation angle along the horizontal direction. Eq. 17 may be used to solve for $(\rho_y, \theta_y)$, which denotes the zooming ratio and rotation angle along the vertical direction.

Plugging Eq. 11 into Eq. 17 may yield Eq. 18:

$$\begin{cases} \rho_y \cdot \sin\theta_y = \dfrac{mv_x^2 - mv_x^0}{h} \\ \rho_y \cdot \cos\theta_y = \dfrac{mv_y^2 - mv_y^0}{h} + 1 \end{cases} \qquad \text{Eq. 18}$$

One or more LUTs (e.g., similarly applied as LUTs described herein) may be used to solve for one or more of $\rho_y$, $\sin\theta_y$, and/or $\cos\theta_y$. Symmetric mapping (e.g. using one or more LUTs) may be conducted on model parameters to map from $(d_x, d_y, \rho_y, \theta_y)$ to $(-d_x, -d_y, \rho_y^{-1}, -\theta_y)$. The bottom-left control point MV from the other direction may be provided, for example, by Eq. 19:

$$\begin{cases} mvSym_x^2 = -\rho_y^{-1}\sin\theta_y \cdot h - d_x \\ mvSym_y^2 = (\rho_y^{-1}\cos\theta_y - 1) \cdot h - d_y \end{cases} \qquad \text{Eq. 18}$$

As presented by way of example herein, different symmetric mapping schemes may be used to construct symmetric affine merge candidates and symmetric merge candidates for regular inter prediction. One or more aspects, considerations or variations used for symmetric affine merge candidate construction and symmetric merge candidate construction for regular inter prediction may be similar (e.g., the same). Similar considerations or variations may include, for example, one or more of the following: an equal (e.g., or nearest) POC distance condition, a maximum number of allowed symmetric merge candidates, types of existing merge candidates that may be used (e.g., uni-pred only, bi-pred only, or both) to construct symmetric candidates, etc.

A coding syntax on affine merge mode (e.g., merge_subblock_flag and merge_subblock_index) may be provided. Affine merge candidate list construction may be provided. Symmetric affine merge candidates (e.g., as described herein) may be added to an affine merge candidate list, for example, after a constructed affine merge MV candidate and before a zero MV candidate).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device for video decoding, comprising:
    a processor configured to:
    obtain, for a prediction unit (PU) in a current picture, a merge candidate list having a first merge candidate comprising a first motion vector (MV) associated with a first reference picture;
    obtain a symmetric merge candidate based on the first merge candidate, the symmetric merge candidate comprising the first MV and a second MV symmetric to the first MV, wherein the second MV symmetric to the first MV is associated with a second reference picture;
    generate an updated merge candidate list for a prediction of an MV for the PU by inserting the symmetric merge candidate into the merge candidate list, wherein the updated merge candidate list comprises the first merge candidate and the symmetric merge candidate; and
    decode, based on the prediction of the MV for the PU, the current picture comprising the PU.

2. The device of claim 1, wherein the first reference picture and the second reference picture have a same picture order count (POC) distance, in opposite directions, to the current picture.

3. The device of claim 1, wherein the processor is further configured to:
    determine whether a reference picture list comprises a symmetric reference picture having a picture order count (POC) distance to the current picture equal to a POC distance between the first reference picture and the current picture; and select the first merge candidate to derive the symmetric merge candidate based on a determination that the reference picture list comprises the symmetric reference picture.

4. The device of claim 1, wherein the first reference picture is in a first reference picture list, and the processor is further configured to:
   determine whether a symmetric reference picture having a picture order count (POC) distance to the current picture equal to a POC distance between the first reference picture and the current picture exists in a second reference picture list; and
   when the symmetric reference picture does not exist in the second reference picture list, select, in the second reference picture list, a reference picture having a POC distance to the current picture closest to the POC distance between the first reference picture and the current picture as the second reference picture.

5. The device of claim 1, wherein the processor is further configured to:
   apply motion vector scaling to construct the second MV for the symmetric merge candidate based on a picture order count (POC) distance between the second reference picture and the current picture, and a POC distance between the first reference picture and the current picture.

6. The device of claim 1, wherein the first merge candidate is a uni-directional prediction merge candidate or a bi-directional prediction merge candidate.

7. The device of claim 1 wherein the processor is further configured to:
   determine that the first merge candidate is a bi-directional prediction candidate having the first MV associated with the first reference picture in a first reference picture list and a third MV associated with a third reference picture in a second reference picture list; and
   obtaining a fourth MV symmetric to the third MV and associated with a fourth reference picture in the first reference picture list, where a picture order count (POC) distance between the fourth reference picture and the current picture is equal or similar to a POC distance between the third reference picture and the current picture, wherein a second symmetric merge candidate of the first merge candidate comprises the third MV and the fourth MV associated with the fourth reference picture in the first reference picture list.

8. The device of claim 1, wherein the processor is further configured to:
   determine, before inserting the symmetric merge candidate to the merge candidate list, that the symmetric merge candidate is not redundant with any other merge candidate in the merge candidate list.

9. The device of claim 1, wherein the processor is further configured to:
   determine, before inserting the symmetric merge candidate to the merge candidate list, that inserting the symmetric merge candidate to the merge candidate list will not exceed at least one of a number of allowed merge candidates and a number of allowed symmetric merge candidates.

10. The device of claim 1, wherein the first merge candidate and the symmetric merge candidate are affine merge candidates.

11. The device of claim 1, wherein the first MV of the first merge candidate is a candidate control point MV (CPMV) having x and y spatial translations, a zooming factor and a rotation angle, and the processor is further configured to:

perform symmetric mapping of the CPMV to determine symmetric affine parameters that comprises negative x and y spatial translations, an inverse zooming factor and a negative rotation angle having the same magnitude as the rotation angle; and
generate a symmetric CPMV of the symmetric merge candidate based on the symmetric affine parameters.

12. The device of claim 1, wherein the device further comprises a memory.

13. A method for video decoding, comprising:
   obtaining, for a prediction unit (PU) in a current picture, a merge candidate list;
   obtaining, from the merge candidate list, a first merge candidate comprising a first motion vector (MV) associated with a first reference picture;
   obtaining a symmetric merge candidate based on the first merge candidate, the symmetric merge candidate comprising the first MV and a second MV symmetric to the first MV, wherein the second MV symmetric to the first MV is associated with a second reference picture;
   generating an updated merge candidate list for a prediction of an MV for the PU by inserting the symmetric merge candidate into the merge candidate list, wherein the updated merge candidate list comprises the first merge candidate and the symmetric merge candidate; and
   decoding, based on the prediction of the MV for the PU, the current picture comprising the PU.

14. The method of claim 13, further comprising:
   determining whether a reference picture list comprises a symmetric reference picture having a picture order count (POC) distance to the current picture equal to a POC distance between the first reference picture and the current picture; and
   selecting the first merge candidate to derive the symmetric merge candidate based on a determination that the reference picture list comprises the symmetric reference picture.

15. The method of claim 13, wherein the first reference picture is in a first reference picture list, and the method further comprises:
   determining whether a symmetric reference picture having a picture order count (POC) distance to the current picture equal to a POC distance between the first reference picture and the current picture exists in a second reference picture list; and
   when the symmetric reference picture does not exist in the second reference picture list, selecting, in the second reference picture list, a reference picture having a POC distance to the current picture closest to the POC distance between the first reference picture and the current picture as the second reference picture.

16. The method of claim 13, wherein the method further comprises:
   applying motion vector scaling to construct the second MV for the symmetric merge candidate based on a picture order count (POC) distance between the second reference picture and the current picture, and a POC distance between the first reference picture and the current picture.

17. A device for video encoding, comprising:
   a processor configured to:
   obtain, for a prediction unit (PU) in a current picture, a merge candidate list having a first merge candidate comprising a first motion vector (MV) associated with a first reference picture;

obtain a symmetric merge candidate based on the first merge candidate, the symmetric merge candidate comprising the first MV and a second MV symmetric to the first MV, wherein the second MV symmetric to the first MV is associated with a second reference picture;

generate an updated merge candidate list for a prediction of an MV for the PU by inserting the symmetric merge candidate into the merge candidate list, wherein the updated merge candidate list comprises the first merge candidate and the symmetric merge candidate; and encode, based on the prediction of the MV for the PU, the current picture comprising the PU.

18. The device of claim 17, wherein the first reference picture and the second reference picture have a same picture order count (POC) distance, in opposite directions, to the current picture.

19. The device of claim 17, wherein the processor is further configured to:

determine whether a reference picture list comprises a symmetric reference picture having a picture order count (POC) distance to the current picture equal to a POC distance between the first reference picture and the current picture; and select the first merge candidate to derive the symmetric merge candidate based on a determination that the reference picture list comprises the symmetric reference picture.

20. The device of claim 17, wherein the first reference picture is in a first reference picture list, and the processor is further configured to:

determine whether a symmetric reference picture having a picture order count (POC) distance to the current picture equal to a POC distance between the first reference picture and the current picture exists in a second reference picture list; and when the symmetric reference picture does not exist in the second reference picture list, select, in the second reference picture list, a reference picture having a POC distance to the current picture closest to the POC distance between the first reference picture and the current picture as the second reference picture.

21. A method for video encoding, comprising:

obtaining, for a prediction unit (PU) in a current picture, a merge candidate list having a first merge candidate comprising a first motion vector (MV) associated with a first reference picture;

obtaining a symmetric merge candidate based on the first merge candidate, the symmetric merge candidate comprising the first MV and a second MV symmetric to the first MV, wherein the second MV symmetric to the first MV is associated with a second reference picture;

generating an updated merge candidate list for a prediction of an MV for the PU by inserting the symmetric merge candidate into the merge candidate list, wherein the updated merge candidate list comprises the first merge candidate and the symmetric merge candidate; and encoding, based on the prediction of the MV for the PU, the current picture comprising the PU.

* * * * *